US012083809B2

(12) United States Patent
Tojo et al.

(10) Patent No.: US 12,083,809 B2
(45) Date of Patent: Sep. 10, 2024

(54) LIQUID EJECTING APPARATUS

(71) Applicant: SEIKO EPSON CORPORATION, Tokyo (JP)

(72) Inventors: Seiji Tojo, Shiojiri (JP); Eiji Miyashita, Tomi (JP); Seiya Sato, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 122 days.

(21) Appl. No.: 18/056,176

(22) Filed: Nov. 16, 2022

(65) Prior Publication Data

US 2023/0150286 A1 May 18, 2023

(30) Foreign Application Priority Data

Nov. 18, 2021 (JP) ................................ 2021-187669

(51) Int. Cl.
*B41J 2/175* (2006.01)
*B41J 29/393* (2006.01)

(52) U.S. Cl.
CPC ......... *B41J 29/393* (2013.01); *B41J 2/17509* (2013.01)

(58) Field of Classification Search
CPC ........ B41J 2/175; B41J 2/17509; B41J 29/02; B41J 29/13; B41J 29/38; B41J 29/393
See application file for complete search history.

(56) References Cited

U.S. PATENT DOCUMENTS

2017/0129243 A1 5/2017 Otagiri et al.

FOREIGN PATENT DOCUMENTS

JP H11-268289 A 10/1999
JP H11-268303 A 10/1999
JP 2016-175279 A 10/2016
JP 2017-087494 A 5/2017

*Primary Examiner* — Anh T Vo
(74) *Attorney, Agent, or Firm* — WORKMAN NYDEGGER

(57) ABSTRACT

There is provided a liquid ejecting apparatus including: a head that ejects a liquid; a supply unit that supplies a liquid to the head; a maintenance unit for maintaining the head; a selector unit that selects a unit to be opened to an atmosphere from the supply unit and the maintenance unit; and a housing that accommodates the supply unit, the maintenance unit, and the selector unit, in which the housing has an opening surface to which an exposure opening is open and a cover that closes the exposure opening, the exposure opening exposes the supply unit, the maintenance unit, and the selector unit, and when the exposure opening is viewed from a position facing the opening surface, the supply unit, the maintenance unit, and the selector unit are positioned not to overlap each other.

12 Claims, 19 Drawing Sheets

LIQUID EJECTING APPARATUS

The present application is based on, and claims priority from JP Application Serial Number 2021-187669, filed Nov. 18, 2021, the disclosure of which is hereby incorporated by reference herein in its entirety.

BACKGROUND

1. Technical Field

The present disclosure relates to a liquid ejecting apparatus.

2. Related Art

JP-A-2016-175279 includes a plurality of units such as a head unit, a wiping unit, a cap unit, and an ejecting unit, and a housing for accommodating the plurality of units. In this liquid ejecting apparatus, the cap unit and the ejecting unit are configured to be replaceable through an opening formed in the housing. The cap unit becomes accessible when the ejecting unit is removed.

In such a liquid ejecting apparatus, when one unit is replaced, it is necessary to remove another unit. Therefore, it may take time and effort to replace the unit.

SUMMARY

According to an aspect of the present disclosure, there is provided a liquid ejecting apparatus including: a head having a nozzle that ejects a liquid; a supply unit that supplies a liquid to the head; a maintenance unit for maintaining the head; a selector unit that selects a unit to be opened to an atmosphere from the supply unit and the maintenance unit; and a housing that accommodates the supply unit, the maintenance unit, and the selector unit, in which the housing has an opening surface to which an exposure opening is open and a cover that closes the exposure opening, the exposure opening exposes the supply unit, the maintenance unit, and the selector unit, and when the exposure opening is viewed from a position facing the opening surface, the supply unit, the maintenance unit, and the selector unit are positioned not to overlap each other.

DESCRIPTION OF EXEMPLARY EMBODIMENTS

Hereinafter, an embodiment of a liquid ejecting apparatus will be described with reference to the drawings. The liquid ejecting apparatus is an ink jet type printer that records images such as characters and photographs by discharging ink, which is an example of a liquid, onto a medium such as paper or cloth.

Figure 1:
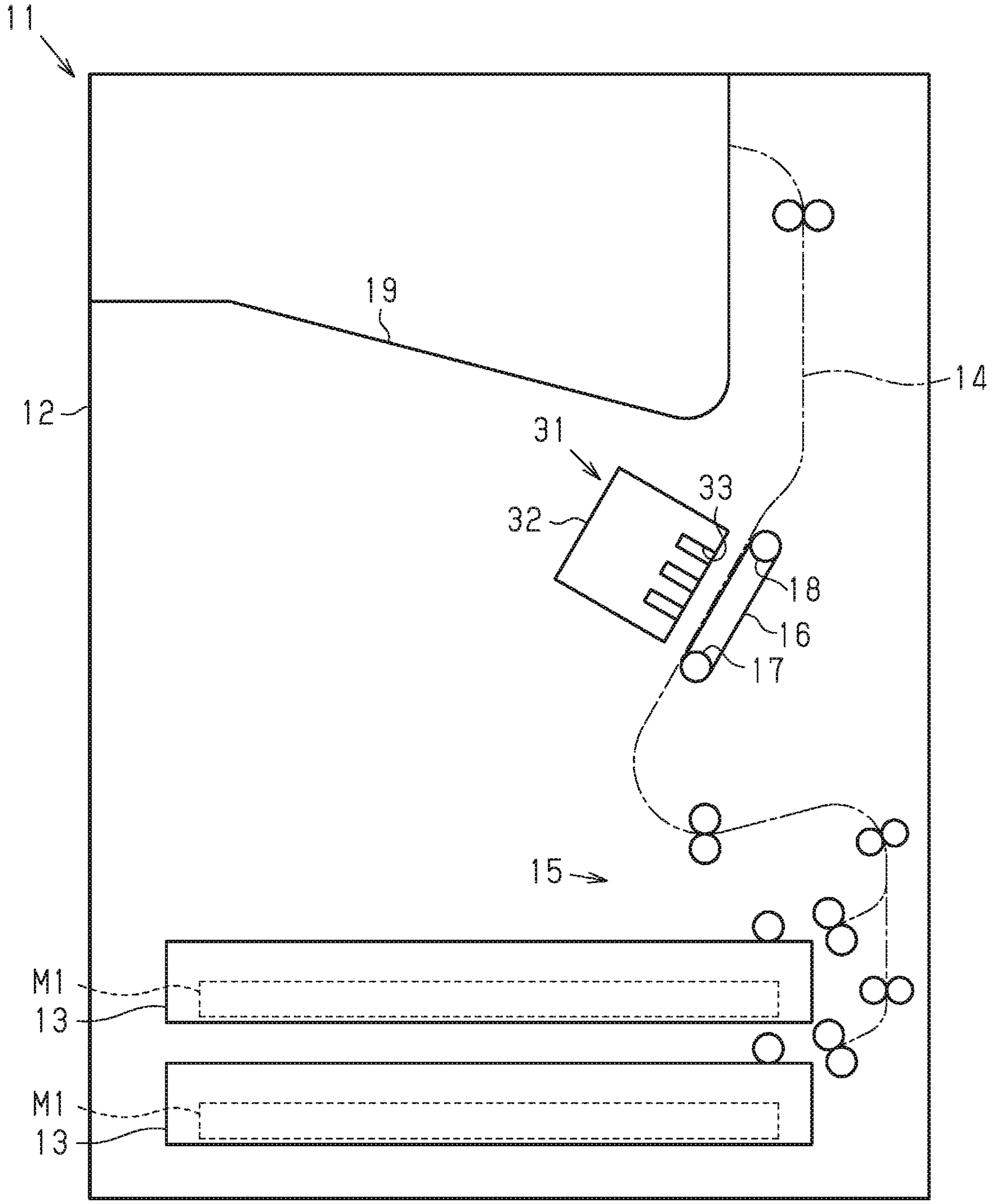
FIG. 1 is a front view illustrating an embodiment of a liquid ejecting apparatus.

As illustrated in FIG. 1, a liquid ejecting apparatus 11 includes a housing 12. The housing 12 will be described later.

The liquid ejecting apparatus 11 includes one or more accommodating sections 13. The accommodating section 13 is configured to accommodate a medium M1. The accommodating section 13 is, for example, a cassette that can be drawn out from the housing 12.

The liquid ejecting apparatus 11 includes a transport path 14. The transport path 14 is a path through which the medium M1 is transported. The transport path 14 extends within the housing 12. In this example, the transport path 14 extends from the accommodating section 13 to eject the medium M1 out of the housing 12. The medium M1 records an image in the process of being transported along the transport path 14.

The liquid ejecting apparatus 11 includes a transport section 15. The transport section 15 is configured to transport the medium M1. The transport section 15 has, for example, one or more rollers. The transport section 15 transports the medium M1 accommodated in the accommodating section 13 along the transport path 14.

In this example, the transport section 15 includes a transport belt 16, a first pulley 17, and a second pulley 18. The transport belt 16 is wound around the first pulley 17 and the second pulley 18. The transport belt 16 attracts the medium M1 by, for example, electrostatic attraction. As a result, the transport belt 16 supports the medium M1. The first pulley 17 and the second pulley 18 are positioned along the transport path 14. The rotation of the first pulley 17 and the second pulley 18 causes the transport belt 16 to circulate. As a result, the medium M1 supported by the transport belt 16 is transported.

The liquid ejecting apparatus 11 includes a stacker 19. The recorded medium M1 is loaded on the stacker 19. The stacker 19 is positioned outside the housing 12, for example. In this example, the medium M1 ejected to the outside of the housing 12 through the transport path 14 is loaded on the stacker 19.

Next, the housing 12 will be described.

Figure 2:
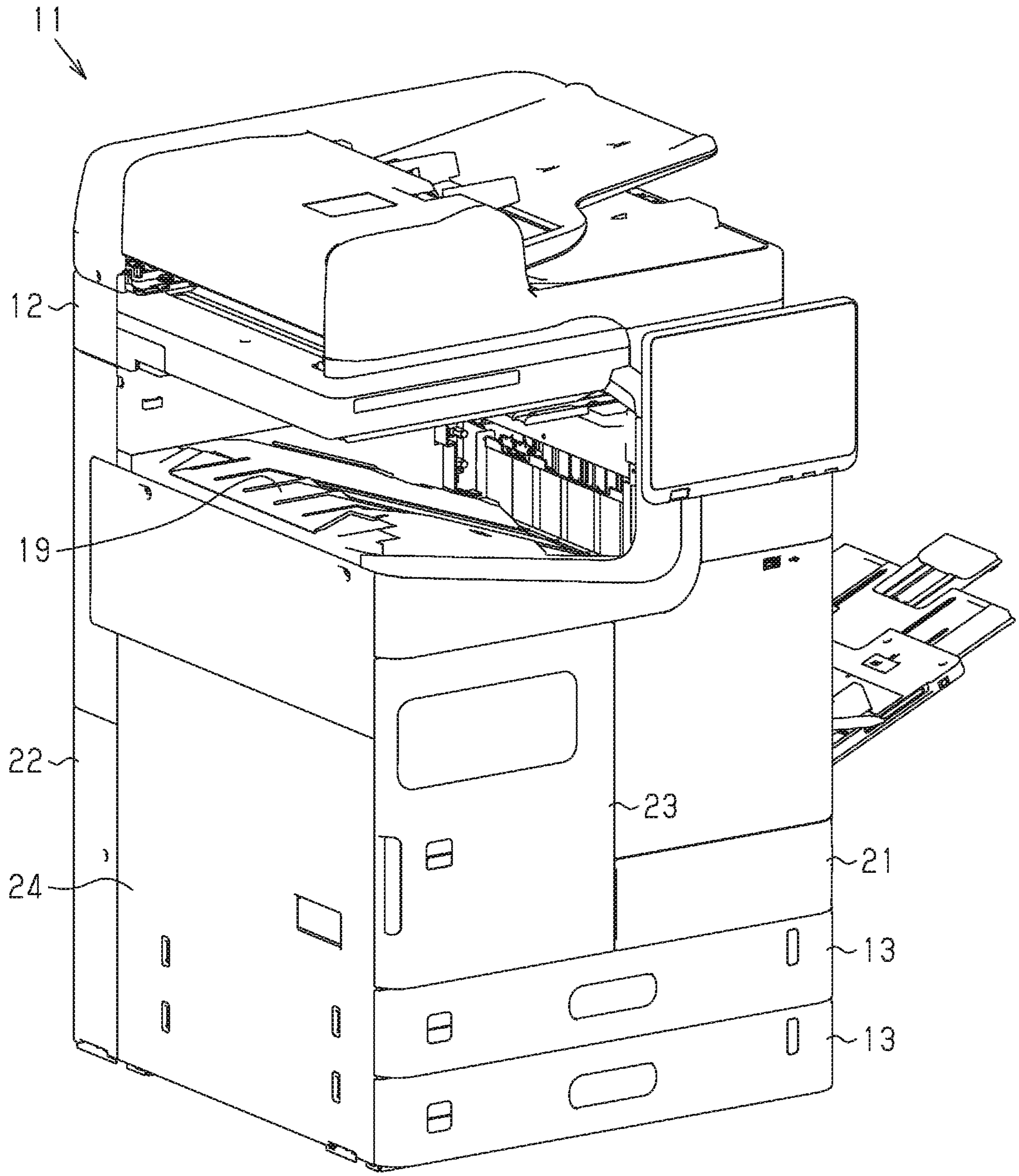
FIG. 2 is a perspective view of the liquid ejecting apparatus.

As illustrated in FIG. 2, the housing 12 has, for example, a rectangular parallelepiped shape as a whole. The housing 12 has a plurality of surfaces. The housing 12 has a drawer surface 21. The drawer surface 21 is a surface on which the accommodating section 13 is drawn out of the housing 12. The housing 12 has an opening surface 22. The opening surface 22 is, for example, a surface adjacent to the drawer surface 21.

The housing 12 has one or more covers. The housing 12 has an open cover 23. The open cover 23 is positioned on the drawer surface 21. The open cover 23 is configured to be openable and closable in, for example, the housing 12. When the open cover 23 is opened, the inside of the housing 12 is exposed. The open cover 23 may be configured to be attachable and detachable in the housing 12. The housing 12 has an exposure cover 24. The exposure cover 24 is positioned on the opening surface 22. The exposure cover 24 is configured to be attachable and detachable in the housing 12, for example. Similarly to the open cover 23, the exposure cover 24 may be configured to be openable and closable in the housing 12.

Figure 3:
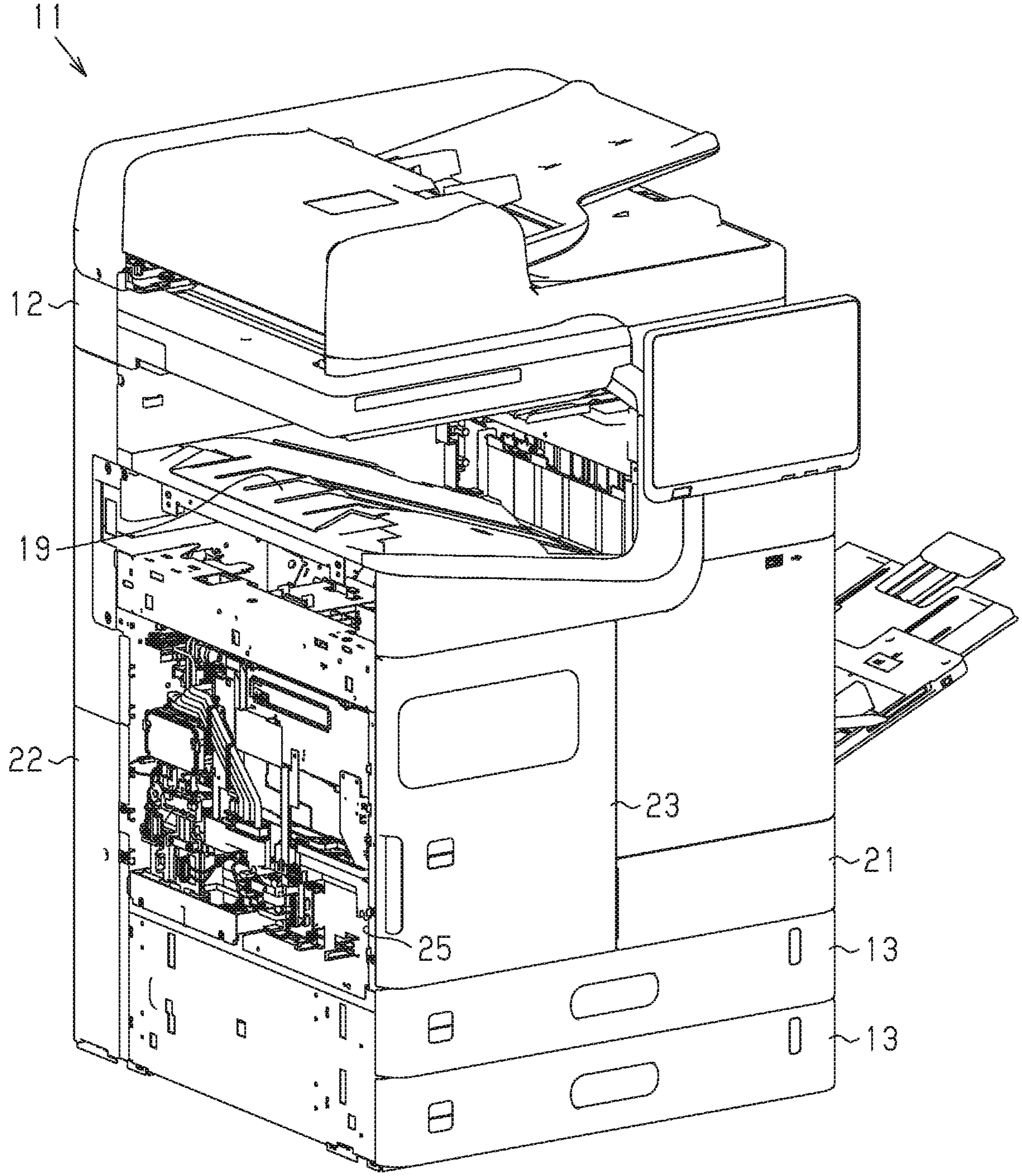
FIG. 3 is a perspective view in which an exposure cover is removed from FIG. 2.

As illustrated in FIG. 3, the housing 12 has an exposure opening 25. The exposure opening 25 is open to the opening surface 22. The exposure opening 25 is closed by the exposure cover 24. When the exposure cover 24 is removed, the exposure opening 25 is exposed. The inside of the housing 12 is exposed through the exposure opening 25. Specifically, a plurality of units included in the liquid ejecting apparatus 11 are exposed through the exposure opening 25.

Figure 4:
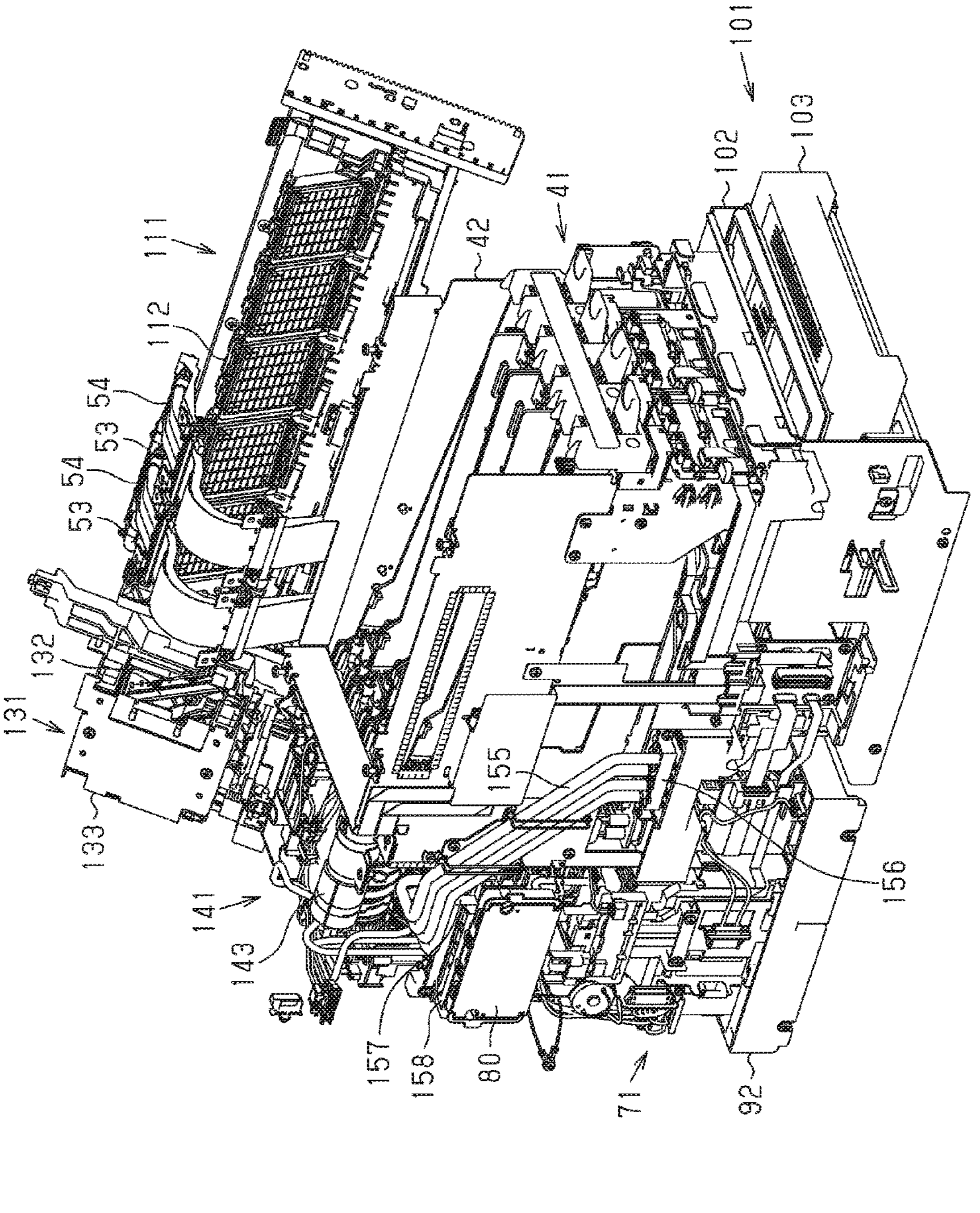
FIG. 4 is a perspective view of a plurality of units included in the liquid ejecting apparatus.
Figure 5:
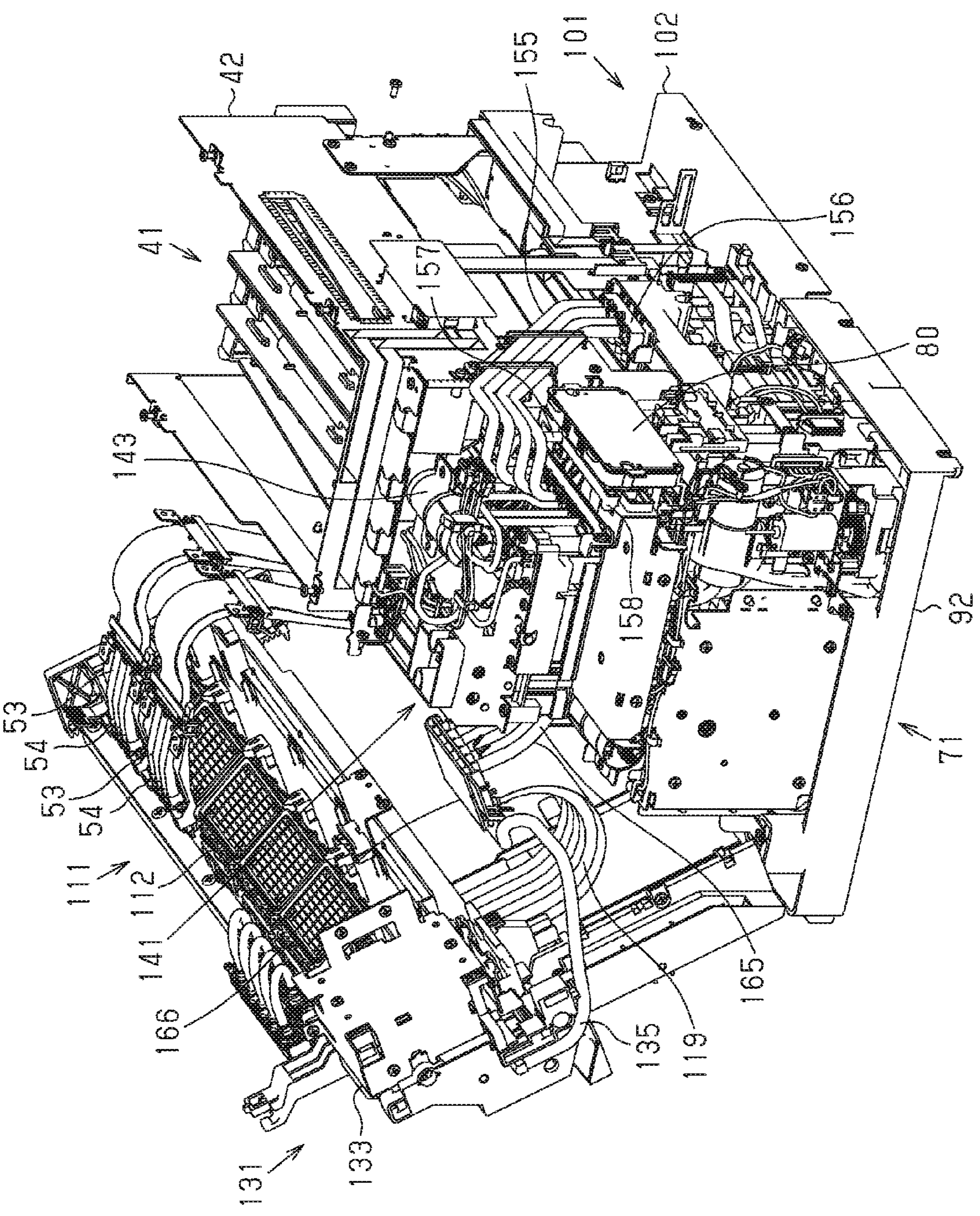
FIG. 5 is a perspective view seen from a different angle from FIG. 4.
Figure 6:
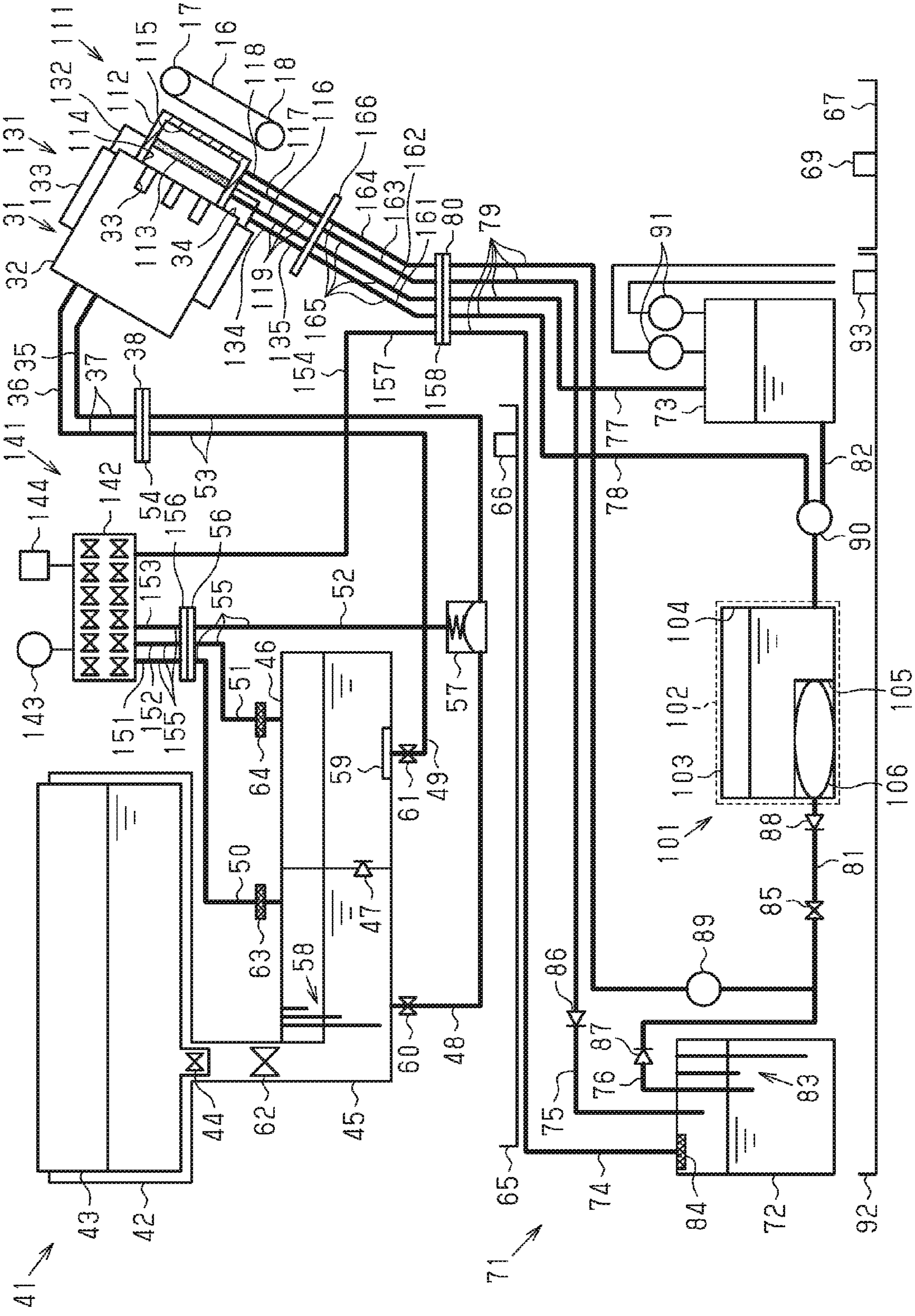
FIG. 6 is a schematic view illustrating an inner configuration of the liquid ejecting apparatus.

As illustrated in FIGS. 4, 5, and 6, the liquid ejecting apparatus 11 includes a plurality of units. The liquid ejecting apparatus 11 includes, for example, a head unit 31, a supply unit 41, a maintenance unit 71, a mounting unit 101, a cap unit 111, a wiping unit 131, and a selector unit 141. In FIGS. 4 and 5, the head unit 31 is omitted. The housing 12 accommodates these units.

The liquid ejecting apparatus 11 includes a plurality of fixing members. The plurality of fixing members are members that fix the plurality of units to the housing 12, respectively. The plurality of fixing members fix each of the supply unit 41, the maintenance unit 71, and the selector unit 141 to the housing 12, for example. The fixing member is, for example, a screw, a pin, or the like. Each of the plurality of units is fixed to the housing 12 by the fixing member. Specifically, the plurality of units are fixed to the sheet metal included in the housing 12 by the fixing member. The fixing member will be described as appropriate together with the description of each unit.

As illustrated in FIG. 6, the liquid ejecting apparatus 11 includes the head unit 31. The head unit 31 is a unit that records an image on the medium M1.

The head unit 31 has a head 32. The head 32 has one or more nozzles 33. The head 32 ejects the liquid from the nozzle 33. The head 32 has a nozzle surface 34, which is a surface through which the nozzle 33 is open. The head 32 records an image on the medium M1 by discharging a liquid from the nozzle 33 onto the medium M1.

The head 32 records an image on the medium M1 transported by the transport section 15. The head 32 is positioned, for example, at a position facing the transport belt 16. In this example, the head 32 records an image on the medium M1 supported by the transport belt 16.

The head unit 31 has a first head flow path 35 and a second head flow path 36. The first head flow path 35 and the second head flow path 36 are flow paths through which a liquid flows. The first head flow path 35 and the second head flow path 36 are coupled to the supply unit 41.

The first head flow path 35 and the second head flow path 36 each have a head flow path part 37. The head flow path part 37 may include an elastic tube, a rigid pipe, or a flow path formed by a groove carved in the plate.

The first head flow path 35 and the second head flow path 36 have a joint. The first head flow path 35 and the second head flow path 36 have a common head joint 38. The head joint 38 is positioned at one end of the head flow path part 37. The head joint 38 constitutes one end of the first head flow path 35 and one end of the second head flow path 36. Each of the first head flow path 35 and the second head flow path 36 may individually have a joint.

The first head flow path 35 and the second head flow path 36 extend from the head 32. The first head flow path 35 and the second head flow path 36 are flow paths that couple the head 32 to the supply unit 41. The head joint 38 is positioned at the distal end of the first head flow path 35 and the second head flow path 36.

The liquid ejecting apparatus 11 includes a supply unit 41. The supply unit 41 is a unit that supplies a liquid to the head 32.

The supply unit 41 has a holder 42. The holder 42 is configured such that one or more liquid accommodating bodies 43 can be mounted. In this example, the holder 42 is configured such that four liquid accommodating bodies 43 can be mounted. The four liquid accommodating bodies 43 accommodate, for example, different liquids. The four liquid accommodating bodies 43 accommodate, for example, cyan ink, magenta ink, yellow ink, and black ink, respectively.

The liquid accommodating body 43 is, for example, a cartridge that accommodates a liquid. When the liquid accommodating body 43 is mounted to the holder 42, the liquid can be supplied from the liquid accommodating body 43 to the head 32. The liquid accommodating body 43 is replaced, for example, through the drawer surface 21. The liquid accommodating body 43 can be replaced by opening the open cover 23. The liquid accommodating body 43 may have an accommodating body valve 44. In this case, the accommodating body valve 44 is open when the liquid accommodating body 43 is mounted to the holder 42.

The supply unit 41 has a first tank 45. The first tank 45 is coupled to the holder 42. The first tank 45 is configured to store a liquid. The first tank 45 stores the liquid flowing from the liquid accommodating body 43. The liquid flows from the liquid accommodating body 43 into the first tank 45, for example, due to the water head difference.

The supply unit 41 has a second tank 46. The second tank 46 is coupled to the first tank 45. The second tank 46 is configured to store the liquid. The second tank 46 stores the liquid flowing from the first tank 45.

The supply unit 41 has a one-way valve. The supply unit 41 has a tank valve 47 as a one-way valve. The tank valve 47 is positioned between the first tank 45 and the second tank 46. That is, the first tank 45 and the second tank 46 are coupled via the tank valve 47. The tank valve 47 allows the liquid to flow from the first tank 45 to the second tank 46. The tank valve 47 regulates the flow of liquid from the second tank 46 to the first tank 45.

The supply unit 41 has a first supply flow path 48, a second supply flow path 49, a third supply flow path 50, a fourth supply flow path 51, and a fifth supply flow path 52. The first supply flow path 48 and the second supply flow path 49 are flow paths through which the liquid flows. The third supply flow path 50, the fourth supply flow path 51, and the fifth supply flow path 52 are flow paths through which gas flows. The first supply flow path 48 and the second supply flow path 49 are coupled to the head unit 31.

The third supply flow path 50, the fourth supply flow path 51, and the fifth supply flow path 52 are coupled to the selector unit 141.

The first supply flow path 48 and the second supply flow path 49 each have a liquid flow path part 53. In this example, the liquid flow path part 53 includes an elastic tube. The liquid flow path part 53 may include, for example, a rigid pipe or a flow path formed by a groove carved in the plate.

The first supply flow path 48 and the second supply flow path 49 have a joint. The first supply flow path 48 and the second supply flow path 49 have a common first supply joint 54. The first supply joint 54 is positioned at one end of the liquid flow path part 53. The first supply joint 54 constitutes one end of the first supply flow path 48 and one end of the second supply flow path 49. Each of the first supply flow path 48 and the second supply flow path 49 may individually have a joint.

The first supply flow path 48 extends from the first tank 45. The first supply flow path 48 extends from the lower part of the first tank 45. The first supply flow path 48 is a flow path for coupling the first tank 45 to the head unit 31. The first supply joint 54 is positioned at the distal end of the first supply flow path 48.

The second supply flow path 49 extends from the second tank 46. The second supply flow path 49 extends from the lower part of the second tank 46. The second supply flow path 49 is a flow path for coupling the second tank 46 to the head unit 31. The first supply joint 54 is positioned at the distal end of the second supply flow path 49.

The first supply joint 54 is coupled to the head joint 38. As a result, the first supply flow path 48 is coupled to the first head flow path 35. The second supply flow path 49 is coupled to the second head flow path 36. The supply unit 41 and the head unit 31 are coupled by the first supply flow path 48, the second supply flow path 49, the first head flow path 35, and the second head flow path 36. The liquid flows between the first tank 45 and the head 32 by the first supply flow path 48 and the first head flow path 35. The liquid flows between the second tank 46 and the head 32 by the second supply flow path 49 and the second head flow path 36.

The liquid flow path part 53 may be directly coupled to the head joint 38. The head flow path part 37 may be directly coupled to the first supply joint 54. The head joint 38 and the first supply joint 54 make it simple to couple the head unit 31 and the supply unit 41.

When the head 32 performs printing, the liquid is supplied from the first tank 45 to the head 32 through the first supply flow path 48 and the first head flow path 35, and the liquid is supplied from the second tank 46 to the head 32 through the second supply flow path 49 and the second head flow path 36. For example, the liquid is supplied to the head 32 by the water head difference between the first tank 45 and the head 32 and the water head difference between the second tank 46 and the head 32. By supplying the liquid through two flow paths, that is, a flow path formed by the first supply flow path 48 and the first head flow path 35, and a flow path formed by the second supply flow path 49 and the second head flow path 36, the amount of liquid supplied increases as compared with the case where the liquid is supplied only through any one of the flow paths. Therefore, even when the head 32 consumes a large amount of liquid, the supply of the liquid is stable.

When the head 32 does not perform printing, for example, the liquid circulates in the first tank 45, the second tank 46, and the head 32. In this case, the liquid is sent from the second tank 46 to the head 32 through the second supply flow path 49 and the second head flow path 36, and the liquid is sent from the head 32 to the first tank 45 through the first supply flow path 48 and the first head flow path 35. The circulation of the liquid suppresses the sedimentation of the components contained in the liquid.

The third supply flow path 50, the fourth supply flow path 51, and the fifth supply flow path 52 each have a gas flow path part 55. In this example, the gas flow path part 55 includes a flow path formed by a groove carved in the plate. The gas flow path part 55 may include, for example, an elastic tube or a rigid pipe.

The third supply flow path 50, the fourth supply flow path 51, and the fifth supply flow path 52 have a joint. The third supply flow path 50, the fourth supply flow path 51, and the fifth supply flow path 52 have a common second supply joint 56. The second supply joint 56 is positioned at one end of the gas flow path part 55. The second supply joint 56 constitutes one end of the third supply flow path 50, one end of the fourth supply flow path 51, and one end of the fifth supply flow path 52. Each of the third supply flow path 50, the fourth supply flow path 51, and the fifth supply flow path 52 may individually have a joint.

The third supply flow path 50 extends from the first tank 45. The third supply flow path 50 extends from the upper part of the first tank 45. The third supply flow path 50 is a flow path for coupling the first tank 45 to the selector unit 141. The second supply joint 56 is positioned at the distal end of the third supply flow path 50.

The fourth supply flow path 51 extends from the second tank 46. The fourth supply flow path 51 extends from the upper part of the second tank 46. The fourth supply flow path 51 is a flow path for coupling the second tank 46 to the selector unit 141. The second supply joint 56 is positioned at the distal end of the fourth supply flow path 51.

The fifth supply flow path 52 extends from a pressurizing section 57, which will be described later. The fifth supply flow path 52 is a flow path for coupling the pressurizing section 57 to the selector unit 141. The second supply joint 56 is positioned at the distal end of the fifth supply flow path 52.

The supply unit 41 has a pressurizing section 57. The pressurizing section 57 is configured to pressurize the liquid in the head 32. The pressurizing section 57 is, for example, a diaphragm pump. The pressurizing section 57 has, for example, a flexible film and a spring that presses the flexible film.

The pressurizing section 57 is positioned in the first supply flow path 48. By driving, the pressurizing section 57 pressurizes the liquid in the head 32 through the first supply flow path 48 and the first head flow path 35. As a result, the liquid is vigorously discharged from the nozzle 33. As the liquid is vigorously discharged from the nozzle 33, air bubbles, foreign matter, and the like in the head 32 are ejected. In this example, the vigorous discharge of liquid from the nozzle 33 by the pressurizing section 57 is called cleaning.

The supply unit 41 has a liquid level sensor 58. The liquid level sensor 58 is positioned in, for example, the first tank 45. The liquid level sensor 58 detects, for example, the liquid level of the liquid stored in the first tank 45. As a result, the liquid ejecting apparatus 11 grasps the amount of liquid stored in the first tank 45.

The supply unit 41 has a filter 59. The filter 59 is positioned, for example, in the second tank 46. The filter 59 is positioned at a coupling point with the second supply flow path 49 in the second tank 46. The filter 59 collects foreign matter from the liquid flowing from the second tank 46 to the second supply flow path 49.

The supply unit 41 has one or more on-off valves. The supply unit 41 has, for example, a first supply valve 60, a second supply valve 61, and a third supply valve 62 as on-off valves.

The first supply valve 60 is positioned in the first supply flow path 48. Specifically, the first supply valve 60 is positioned between the first tank 45 and the pressurizing section 57 in the first supply flow path 48. When the first supply valve 60 is opened, the liquid can flow through the first supply flow path 48.

The second supply valve 61 is positioned in the second supply flow path 49. When the second supply valve 61 is opened, the liquid can flow through the second supply flow path 49.

The third supply valve 62 is positioned in the first tank 45. Specifically, the third supply valve 62 is positioned at the coupling point with the holder 42 in the first tank 45. When the third supply valve 62 is opened, the liquid can flow from the liquid accommodating body 43 to the first tank 45.

The supply unit 41 has one or more moisture permeable films. The moisture permeable film is a film through which gas easily passes but a liquid does not easily pass. The supply unit 41 has a first supply film 63 and a second supply film 64 as a moisture permeable film.

The first supply film 63 is positioned in the third supply flow path 50. The first supply film 63 reduces the concern that the liquid flows through the third supply flow path 50. The first supply film 63 reduces the concern that the liquid flows from the first tank 45 to the selector unit 141.

The second supply film 64 is positioned in the fourth supply flow path 51. The second supply film 64 reduces the concern that the liquid flows through the fourth supply flow path 51. The second supply film 64 reduces the concern that the liquid flows from the second tank 46 to the selector unit 141.

As illustrated in FIGS. 6, 7, 8, and 9, the supply unit 41 has a tray. The supply unit 41 has a supply tray 65. The supply tray 65 is positioned at the lower part of the supply unit 41. The supply tray 65 receives the liquid leaked in the supply unit 41. The supply tray 65 receives, for example, the liquid leaked from the liquid accommodating body 43, the liquid leaked from the first tank 45, the liquid leaked from the second tank 46, and the like. When the supply tray 65 receives the liquid, the concern that the liquid leaked in the supply unit 41 spreads in the housing 12 is reduced.

The supply unit 41 has a detecting portion. The supply unit 41 has a supply detecting portion 66. The supply detecting portion 66 is positioned on the supply tray 65. The supply detecting portion 66 detects the liquid received by the supply tray 65. The supply detecting portion 66 detects the liquid by touching the liquid, for example. When the supply detecting portion 66 detects the liquid, the liquid ejecting apparatus 11 grasps that the liquid is leaking in the supply unit 41. The liquid ejecting apparatus 11 notifies the user that the liquid is leaking in the supply unit 41 based on the detection result of the supply detecting portion 66, for example.

Figure 8:
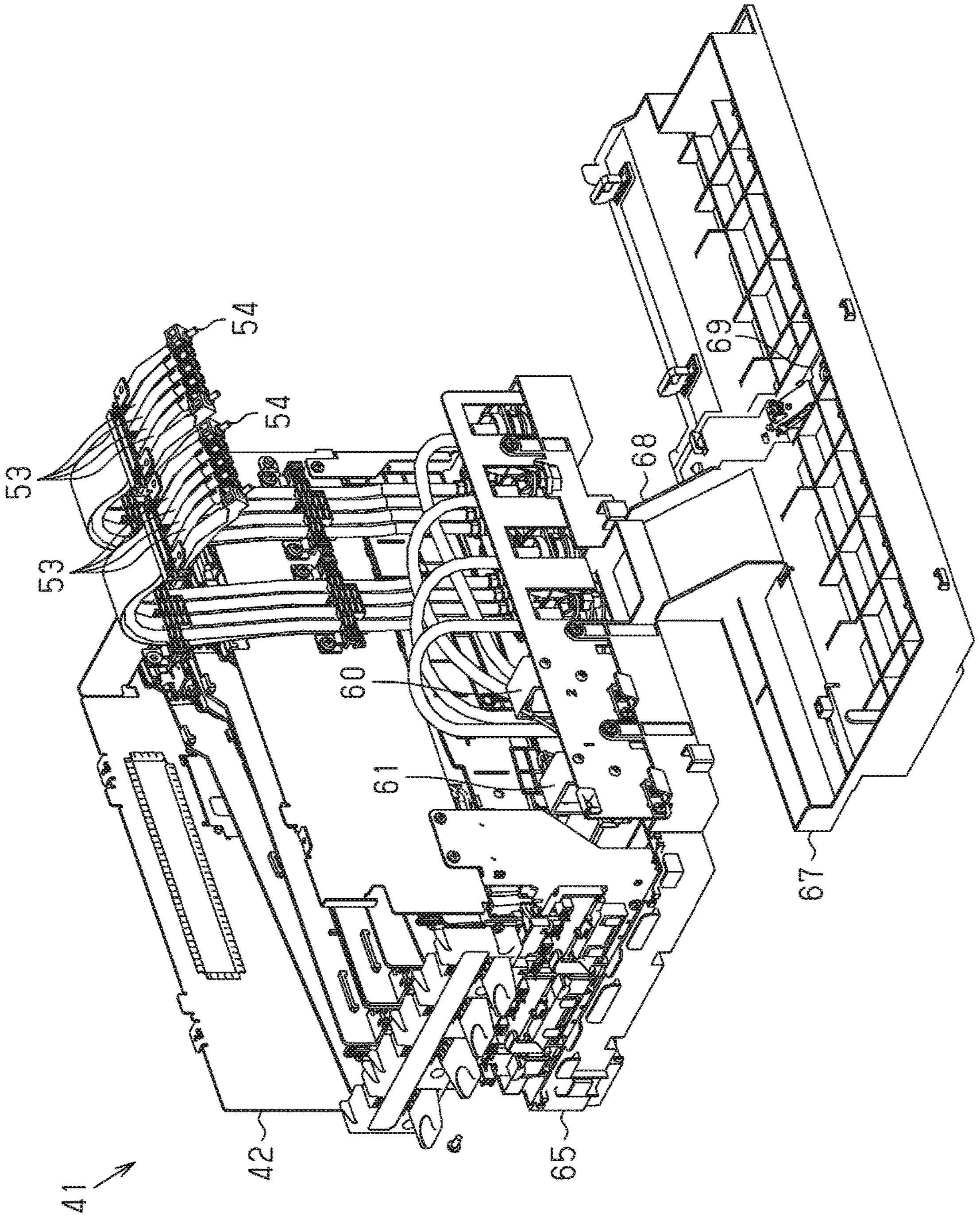
FIG. 8 is a perspective view seen from a different angle from FIG. 7.
Figure 9:
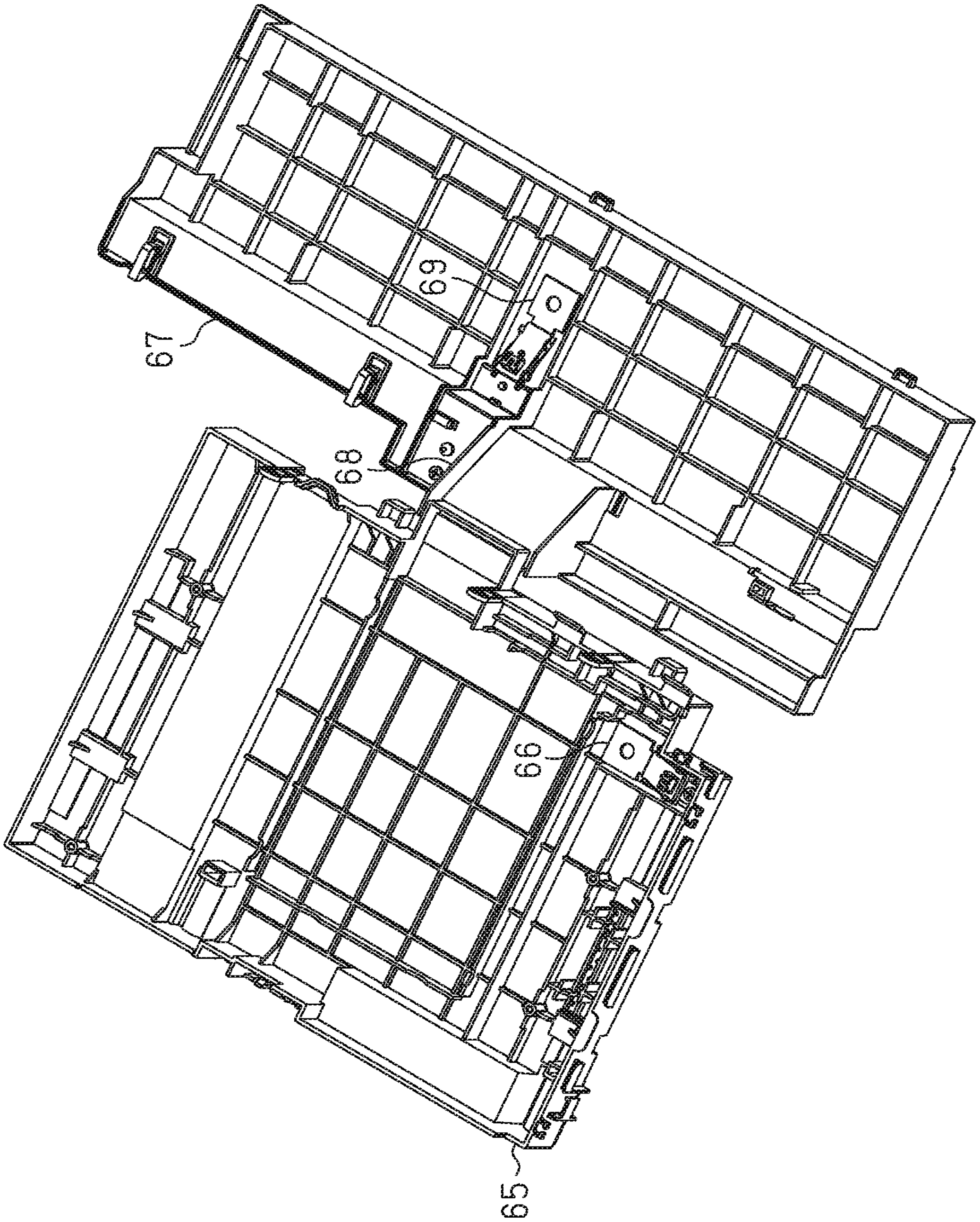
FIG. 9 is a perspective view of a supply tray and an apparatus tray.

In FIG. 8, eight liquid flow path parts 53 are illustrated. This is because the supply unit 41 of this example supplies four types of liquids to the head 32. In the supply unit 41, one first supply flow path 48 and one second supply flow path 49 are prepared for each liquid accommodating body 43 mounted on the holder 42.

The liquid ejecting apparatus 11 includes a tray. The liquid ejecting apparatus 11 includes an apparatus tray 67 in addition to the supply tray 65. The apparatus tray 67 is positioned below the supply tray 65. The apparatus tray 67 is configured to receive the liquid received by the supply tray 65.

The apparatus tray 67 has a coupling part 68. The apparatus tray 67 is coupled to the supply tray 65 by the coupling part 68. The coupling part 68 is a part of the apparatus tray 67 that extends toward the supply tray 65. The coupling part 68 vertically overlaps with the supply tray 65. The coupling part 68 receives the liquid dripping from the supply tray 65. In this manner, the apparatus tray 67 receives the liquid received by the supply tray 65.

When the liquid leaks from the liquid accommodating body 43, there is a concern that the supply tray 65 alone is not able to receive the liquid. Therefore, in this example, when the supply tray 65 receives a predetermined amount or more of the liquid, the liquid flows from the supply tray 65 to the apparatus tray 67. When the apparatus tray 67 receives the liquid, a concern that the liquid leaked in the supply unit 41 spreads in the housing 12 is reduced.

The liquid ejecting apparatus 11 includes a detecting portion. The liquid ejecting apparatus 11 includes a leakage detecting portion 69 in addition to the supply detecting portion 66. The leakage detecting portion 69 has the same configuration as the supply detecting portion 66, for example. The leakage detecting portion 69 is positioned on the apparatus tray 67. The leakage detecting portion 69 detects the liquid received by the apparatus tray 67. When the leakage detecting portion 69 detects the liquid, the liquid ejecting apparatus 11 grasps that a large amount of liquid is leaking in the supply unit 41. The liquid ejecting apparatus 11 notifies the user that a large amount of liquid is leaking in the supply unit 41 based on the detection result of the leakage detecting portion 69, for example.

Figure 7:
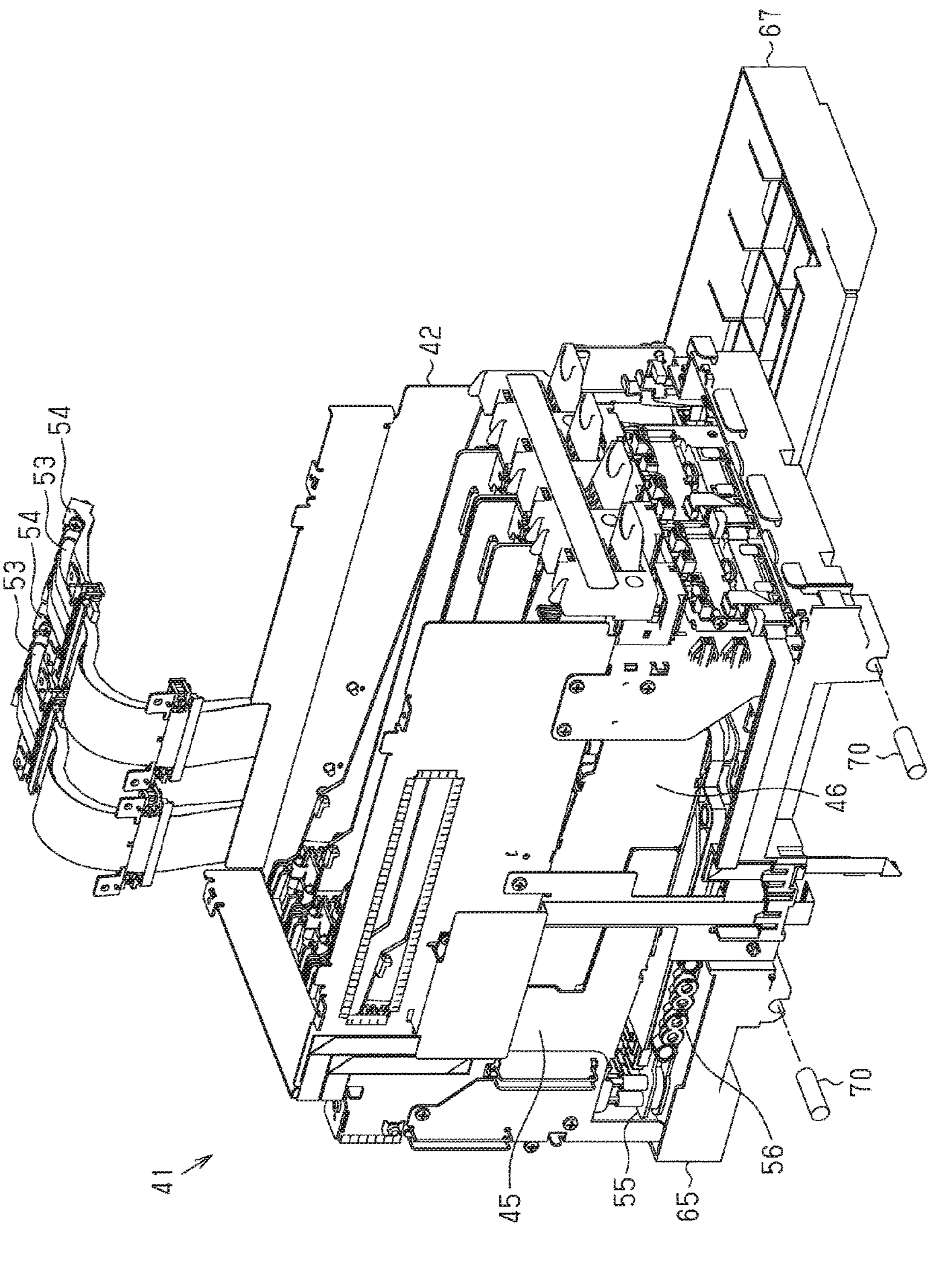
FIG. 7 is a perspective view of a supply unit.

As illustrated in FIG. 7, the liquid ejecting apparatus 11 includes a supply fixing member 70 as an example of the fixing member. The supply fixing member 70 fixes the supply unit 41 to the housing 12. The supply fixing member 70 is attached to, for example, the supply tray 65. As a result, the supply tray 65 is fixed to the housing 12. When the supply fixing member 70 is removed from the supply tray 65, the supply unit 41 can be removed from the housing 12. The supply unit 41 is removable through the exposure opening 25.

As illustrated in FIG. 6, the liquid ejecting apparatus 11 includes a maintenance unit 71. The maintenance unit 71 is a unit for maintaining the head 32.

The maintenance unit 71 has a moisturizer tank 72. The moisturizer tank 72 is configured to store the liquid. The moisturizer tank 72 stores the moisturizer as a liquid. The moisturizer is used to moisturize the nozzle 33. The moisturizer is, for example, water.

The maintenance unit 71 has a buffer tank 73. The buffer tank 73 is configured to store the liquid. The buffer tank 73 stores the waste liquid as a liquid. The waste liquid is the liquid ejected from the head 32. The waste liquid is, for example, a liquid ejected from the head 32 by cleaning. The waste liquid is, for example, a liquid ejected from the head 32 by flushing. Flushing is an operation in which the head 32 appropriately discharges a liquid in order to suppress clogging of the nozzle 33.

The maintenance unit 71 has a first maintenance flow path 74, a second maintenance flow path 75, a third maintenance flow path 76, a fourth maintenance flow path 77, and a fifth maintenance flow path 78. The first maintenance flow path 74 is a flow path through which gas flows. The second maintenance flow path 75, the third maintenance flow path

76, the fourth maintenance flow path 77, and the fifth maintenance flow path 78 are mainly flow paths through which the liquid flows.

The first maintenance flow path 74 is coupled to the selector unit 141. The second maintenance flow path 75, the third maintenance flow path 76, and the fourth maintenance flow path 77 are coupled to the cap unit 111. The fifth maintenance flow path 78 is coupled to the wiping unit 131.

The first maintenance flow path 74, the second maintenance flow path 75, the third maintenance flow path 76, the fourth maintenance flow path 77, and the fifth maintenance flow path 78 each have a maintenance flow path part 79. In this example, the maintenance flow path part 79 includes an elastic tube. The maintenance flow path part 79 may include, for example, a rigid pipe or a flow path formed by grooves carved in the plate.

The first maintenance flow path 74, the second maintenance flow path 75, the third maintenance flow path 76, the fourth maintenance flow path 77, and the fifth maintenance flow path 78 have joints. The first maintenance flow path 74, the second maintenance flow path 75, the third maintenance flow path 76, the fourth maintenance flow path 77, and the fifth maintenance flow path 78 have a common maintenance joint 80. The maintenance joint 80 is positioned at one end of the maintenance flow path part 79. The maintenance joint 80 constitutes one end of the first maintenance flow path 74, one end of the second maintenance flow path 75, one end of the third maintenance flow path 76, one end of the fourth maintenance flow path 77, and one end of the fifth maintenance flow path 78. The first maintenance flow path 74, the second maintenance flow path 75, the third maintenance flow path 76, the fourth maintenance flow path 77, and the fifth maintenance flow path 78 may each have different joints.

The first maintenance flow path 74 extends from the moisturizer tank 72. The first maintenance flow path 74 extends from the upper part of the moisturizer tank 72. The first maintenance flow path 74 is a flow path for coupling the moisturizer tank 72 to the selector unit 141. The maintenance joint 80 is positioned at the distal end of the first maintenance flow path 74.

The second maintenance flow path 75 extends from the moisturizer tank 72. The second maintenance flow path 75 extends from the upper part of the moisturizer tank 72. The second maintenance flow path 75 is a flow path for coupling the moisturizer tank 72 to the cap unit 111. The maintenance joint 80 is positioned at the distal end of the second maintenance flow path 75.

The third maintenance flow path 76 extends from the moisturizer tank 72. The third maintenance flow path 76 extends from the upper part of the moisturizer tank 72. The third maintenance flow path 76 is a flow path for coupling the moisturizer tank 72 to the cap unit 111. The maintenance joint 80 is positioned at the distal end of the third maintenance flow path 76.

The third maintenance flow path 76 has a branch part 81. The branch part 81 is a part of the third maintenance flow path 76 that branches between the moisturizer tank 72 and the maintenance joint 80. The branch part 81 is coupled to the mounting body 103 mounted on the mounting unit 101. Therefore, the third maintenance flow path 76 is also a flow path for coupling the moisturizer tank 72 to the mounting body 103, and is also a flow path for coupling the mounting body 103 and the cap unit 111.

The fourth maintenance flow path 77 extends from the buffer tank 73. The fourth maintenance flow path 77 extends from the upper part of the buffer tank 73. The fourth maintenance flow path 77 is a flow path for coupling the buffer tank 73 to the cap unit 111. The maintenance joint 80 is positioned at the distal end of the fourth maintenance flow path 77.

The fifth maintenance flow path 78 is coupled to the mounting body 103 mounted on the mounting unit 101. The fifth maintenance flow path 78 extends from the mounting body 103. Therefore, the fifth maintenance flow path 78 is a flow path for coupling the mounting body 103 and the wiping unit 131. That is, the mounting body 103 is coupled to the wiping unit 131 via the maintenance unit 71. The maintenance joint 80 is positioned at the distal end of the fifth maintenance flow path 78.

The fifth maintenance flow path 78 has a branch part 82. The branch part 82 is a part of the fifth maintenance flow path 78 that branches between the mounting body 103 and the maintenance joint 80. The branch part 82 is coupled to the buffer tank 73. Therefore, the fifth maintenance flow path 78 is also a flow path for coupling the buffer tank 73 to the mounting body 103, and is also a flow path for coupling the buffer tank 73 to the wiping unit 131.

The maintenance unit 71 has a moisturizer amount sensor 83. The moisturizer amount sensor 83 is positioned in, for example, the moisturizer tank 72. The moisturizer amount sensor 83 detects, for example, the liquid level of the liquid stored in the moisturizer tank 72. As a result, the liquid ejecting apparatus 11 grasps the amount of the moisturizer stored in the moisturizer tank 72.

The maintenance unit 71 has a moisture permeable film. The maintenance unit 71 has a maintenance film 84 as a moisture permeable film. The maintenance film 84 is positioned, for example, in the moisturizer tank 72. The maintenance film 84 is positioned at a coupling point with the first maintenance flow path 74 in the moisturizer tank 72. The maintenance film 84 reduces the concern that the moisturizer flows through the first maintenance flow path 74. The maintenance film 84 reduces the concern that the moisturizer flows from the moisturizer tank 72 to the selector unit 141.

The maintenance unit 71 has a plurality of valves. The maintenance unit 71 has, for example, one or more on-off valves and one or more one-way valves. In this example, the maintenance unit 71 has a first maintenance valve 85 as an on-off valve. The maintenance unit 71 has a second maintenance valve 86, a third maintenance valve 87, and a fourth maintenance valve 88 as one-way valves.

The first maintenance valve 85 is positioned, for example, in the third maintenance flow path 76. The first maintenance valve 85 is positioned at the branch part 81 in the third maintenance flow path 76. When the first maintenance valve 85 is opened, the moisturizer can flow through the branch part 81.

The second maintenance valve 86 is positioned, for example, in the second maintenance flow path 75. The second maintenance valve 86 allows the moisturizer to flow from the cap unit 111 toward the moisturizer tank 72 through the second maintenance flow path 75. The second maintenance valve 86 regulates the flow of the moisturizer from the moisturizer tank 72 toward the cap unit 111 through the second maintenance flow path 75.

The third maintenance valve 87 is positioned, for example, in the third maintenance flow path 76. The third maintenance valve 87 is positioned at a part different from the branch part 81 in the third maintenance flow path 76. The third maintenance valve 87 is positioned between the branch position of the branch part 81 and the moisturizer tank 72 in the third maintenance flow path 76. The third maintenance valve 87 allows the moisturizer to flow from the moisturizer tank 72 toward the branch position of the branch part 81 through the third maintenance flow path 76. The third maintenance valve 87 regulates the flow of the moisturizer from the branch position of the branch part 81 toward the moisturizer tank 72 through the third maintenance flow path 76.

The fourth maintenance valve 88 is positioned, for example, in the third maintenance flow path 76. The fourth maintenance valve 88 is positioned at the branch part 81 in the third maintenance flow path 76. The fourth maintenance valve 88 is positioned between the mounting body 103 and the first maintenance valve 85 at the branch part 81. The fourth maintenance valve 88 allows the moisturizer to flow through the third maintenance flow path 76 from the mounting body 103 toward the branch position of the branch part 81. The fourth maintenance valve 88 regulates the flow of the moisturizer from the branch position of the branch part 81 toward the mounting body 103 through the third maintenance flow path 76.

The maintenance unit 71 has one or more suction pumps. The maintenance unit 71 has a first maintenance pump 89, a second maintenance pump 90, and a third maintenance pump 91 as suction pumps.

The first maintenance pump 89 is positioned in the third maintenance flow path 76. The first maintenance pump 89 is positioned at a part different from the branch part 81 in the third maintenance flow path 76. The first maintenance pump 89 is positioned between the branch position of the branch part 81 and the maintenance joint 80. By driving the first maintenance pump 89, the moisturizer is sent from the moisturizer tank 72 or the mounting body 103 to the cap unit 111.

The second maintenance pump 90 is positioned in the fifth maintenance flow path 78. The second maintenance pump 90 is positioned at the branch position of the branch part 82 in the fifth maintenance flow path 78. By driving the second maintenance pump 90, the waste liquid is sent from the wiping unit 131 or the buffer tank 73 to the mounting body 103.

The third maintenance pump 91 is coupled to the buffer tank 73. In this example, two third maintenance pumps 91 are coupled to the buffer tank 73. The third maintenance pump 91 performs suctioning inside the buffer tank 73. As a result, the waste liquid is sent from the cap unit 111 to the buffer tank 73 through the fourth maintenance flow path 77.

Figure 10:
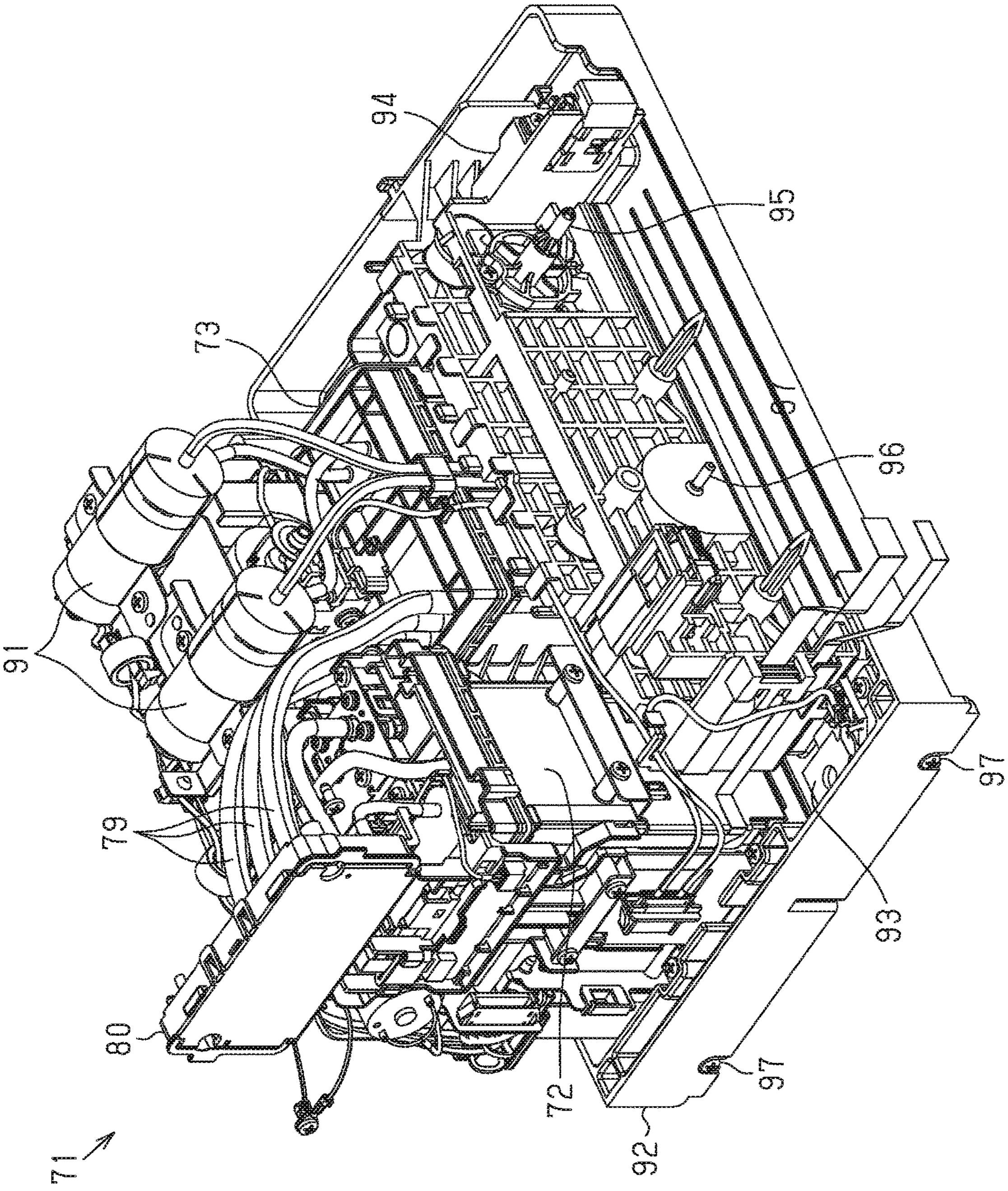
FIG. 10 is a perspective view of a maintenance unit.
Figure 11:
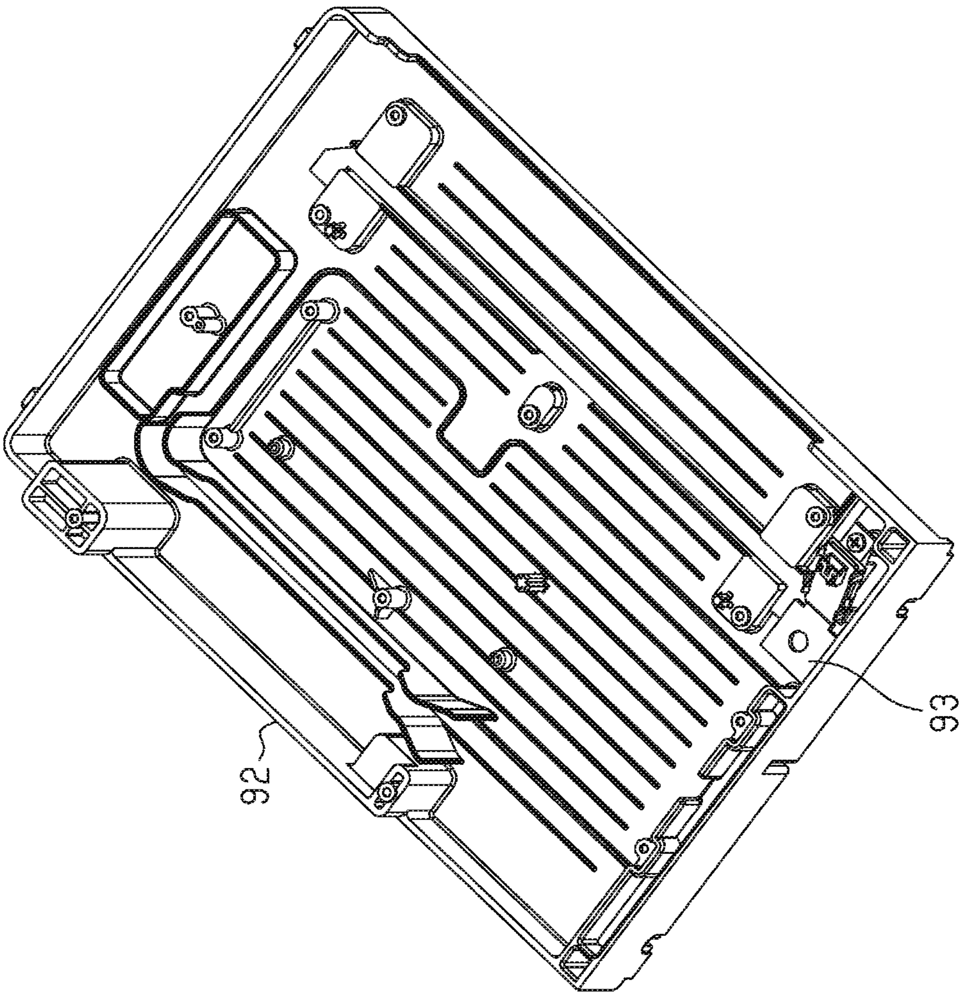
FIG. 11 is a perspective view of a maintenance tray.

As illustrated in FIGS. 6, 10, and 11, the maintenance unit 71 has a tray. The maintenance unit 71 has a maintenance tray 92. The maintenance tray 92 is positioned at the lower part of the maintenance unit 71.

The maintenance tray 92 receives the liquid leaked in the maintenance unit 71, that is, the waste liquid or the moisturizer. The maintenance tray 92 receives, for example, the waste liquid leaked from the buffer tank 73. The maintenance tray 92 receives, for example, the moisturizer leaked from the moisturizer tank 72. The maintenance tray 92 reduces the concern that the leaked waste liquid and the leaked moisturizer in the maintenance unit 71 spread inside the housing 12.

The maintenance unit 71 has a detecting portion. The maintenance unit 71 has a maintenance detecting portion 93. The maintenance detecting portion 93 is positioned on the maintenance tray 92.

The maintenance detecting portion 93 detects the liquid received by the maintenance tray 92, that is, the waste liquid or the moisturizer. The maintenance detecting portion 93 has, for example, the same configuration as the supply detecting portion 66 and the leakage detecting portion 69. When the maintenance detecting portion 93 detects the waste liquid or the moisturizer, the liquid ejecting apparatus 11 grasps that the waste liquid or the moisturizer is leaking in the maintenance unit 71. The liquid ejecting apparatus 11 notifies the user that the waste liquid or the moisturizer is leaking in the maintenance unit 71, for example, based on the detection result of the maintenance detecting portion 93.

In the maintenance unit 71, the third maintenance pump 91 may be exhausted toward the maintenance tray 92. In this case, when the amount of waste liquid stored in the buffer tank 73 approaches the maximum capacity of the buffer tank 73, the waste liquid is ejected to the maintenance tray 92 through the third maintenance pump 91. When the maintenance detecting portion 93 detects this waste liquid, the liquid ejecting apparatus 11 can grasp that the amount of the waste liquid stored in the buffer tank 73 has approached the maximum capacity of the buffer tank 73.

As illustrated in FIG. 10, the maintenance unit 71 has a coupling body 94. The coupling body 94 is a part coupled to the mounting body 103. The coupling body 94 constitutes the third maintenance flow path 76 and the fifth maintenance flow path 78.

The coupling body 94 has a coupling needle 95 and a supply needle 96. The coupling needle 95 and the supply needle 96 are coupled to the mounting body 103. The coupling needle 95 constitutes the fifth maintenance flow path 78. The supply needle 96 constitutes the third maintenance flow path 76. Specifically, the supply needle 96 constitutes the branch part 81.

The liquid ejecting apparatus 11 includes a maintenance fixing member 97 as an example of the fixing member. The maintenance fixing member 97 fixes the maintenance unit 71 to the housing 12. The maintenance fixing member 97 is attached to, for example, the maintenance tray 92. As a result, the maintenance tray 92 is fixed to the housing 12. When the maintenance fixing member 97 is removed from the maintenance unit 71, the maintenance unit 71 can be removed from the housing 12. The maintenance unit 71 is removable through the exposure opening 25.

As illustrated in FIG. 6, the liquid ejecting apparatus 11 includes the mounting unit 101. The mounting unit 101 is a unit configured to be able to mount the mounting body 103 that accommodates a liquid ejected as waste liquid from the head 32. In this example, the mounting body 103 accommodates not only the waste liquid but also the moisturizer.

The mounting unit 101 has a mounting section 102. The mounting section 102 is configured such that the mounting body 103 can be mounted. The mounting body 103 is mounted on the mounting section 102 by being inserted into the mounting section 102.

The mounting body 103 is coupled to the coupling needle 95 and the supply needle 96 by being mounted on the mounting section 102. The mounting body 103 is replaced, for example, through the drawer surface 21. The mounting body 103 can be replaced by opening the open cover 23.

The mounting body 103 has a waste liquid chamber 104 and a moisturizer chamber 105. The waste liquid chamber 104 is a space for accommodating the waste liquid. The waste liquid chamber 104 is coupled to the coupling needle 95. That is, the waste liquid chamber 104 is coupled to the fifth maintenance flow path 78. The moisturizer chamber 105 is a space for accommodating the moisturizer. In this example, the moisturizer chamber 105 accommodates a moisturizer pack 106. The moisturizer pack 106 is a pack that accommodates the moisturizer. The moisturizer pack

106 is coupled to the supply needle 96. That is, the moisturizer pack 106 is coupled to the third maintenance flow path 76.

Figure 12:
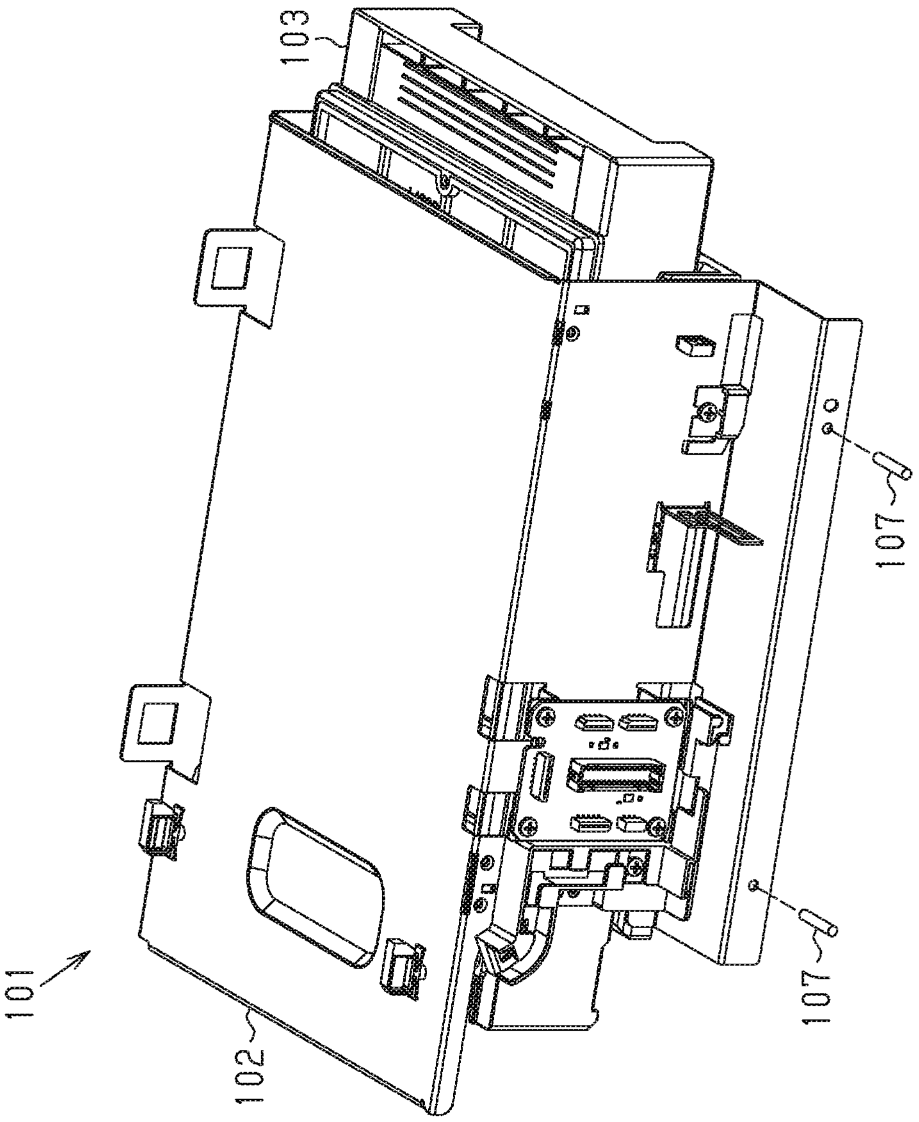
FIG. 12 is a perspective view of a mounting unit.

As illustrated in FIG. 12, the liquid ejecting apparatus 11 includes a mounting fixing member 107 as an example of the fixing member. The mounting fixing member 107 fixes the mounting unit 101 to the housing 12. The mounting fixing member 107 is attached to, for example, the mounting section 102. As a result, the mounting unit 101 is fixed to the housing 12. When the mounting fixing member 107 is removed from the mounting unit 101, the mounting unit 101 can be removed from the housing 12. The mounting unit 101 is removable through the exposure opening 25.

As illustrated in FIG. 6, the liquid ejecting apparatus 11 includes a cap unit 111. The cap unit 111 is a unit for maintaining the head 32.

The cap unit 111 has one or more caps 112. The cap 112 comes into contact with the head 32 to cover the nozzle 33. The cap 112 covers the nozzle 33 by coming into contact with the nozzle surface 34. In this example, covering the nozzle 33 with the cap 112 is called capping.

The cap 112 moisturizes the nozzle 33 by capping. Further, the cap 112 receives the waste liquid from the head 32. The cap 112 receives, for example, waste liquid by cleaning and waste liquid by flushing. As a result, the cap 112 maintains the head 32.

The cap 112 can be displaced to a position in contact with the head 32 and a position away from the head 32. When the head 32 does not perform printing, the cap 112 is displaced to a position in contact with the head 32. The position in contact with the head 32 is, for example, a position between the head 32 and the transport belt 16. When the head 32 performs printing, the cap 112 is displaced away from the head 32.

The cap unit 111 has a moisture permeable film. The cap unit 111 has a cap film 113 as a moisture permeable film. The cap film 113 is positioned within the cap 112. The cap film 113 partitions the inside of the cap 112 into a waste liquid space 114 and a moisturizer space 115.

The waste liquid space 114 is a space for receiving the waste liquid from the head 32. The moisturizer space 115 is a space for holding the moisturizer. The nozzle 33 is moisturized by the moisturizer vaporized in the moisturizer space 115 filling the waste liquid space 114 through the cap film 113.

The cap unit 111 has a first cap flow path 116, a second cap flow path 117, and a third cap flow path 118. The first cap flow path 116, the second cap flow path 117, and the third cap flow path 118 are mainly flow paths through which a liquid flows. The first cap flow path 116, the second cap flow path 117, and the third cap flow path 118 are coupled to the maintenance unit 71.

The first cap flow path 116, the second cap flow path 117, and the third cap flow path 118 each have a cap flow path part 119. The cap flow path part 119 includes, for example, an elastic tube. The cap flow path part 119 may include a rigid pipe or may include a flow path formed by a groove carved in the plate.

The first cap flow path 116 extends from the cap 112. Specifically, the first cap flow path 116 extends from the waste liquid space 114. The first cap flow path 116 is a flow path for coupling the cap 112 to the maintenance unit 71.

The second cap flow path 117 extends from the cap 112. Specifically, the second cap flow path 117 extends from the moisturizer space 115. The second cap flow path 117 is a flow path for coupling the cap 112 to the maintenance unit 71.

The third cap flow path 118 extends from the cap 112. Specifically, the third cap flow path 118 extends from the moisturizer space 115. The third cap flow path 118 is a flow path for coupling the cap 112 to the maintenance unit 71.

Figure 13:
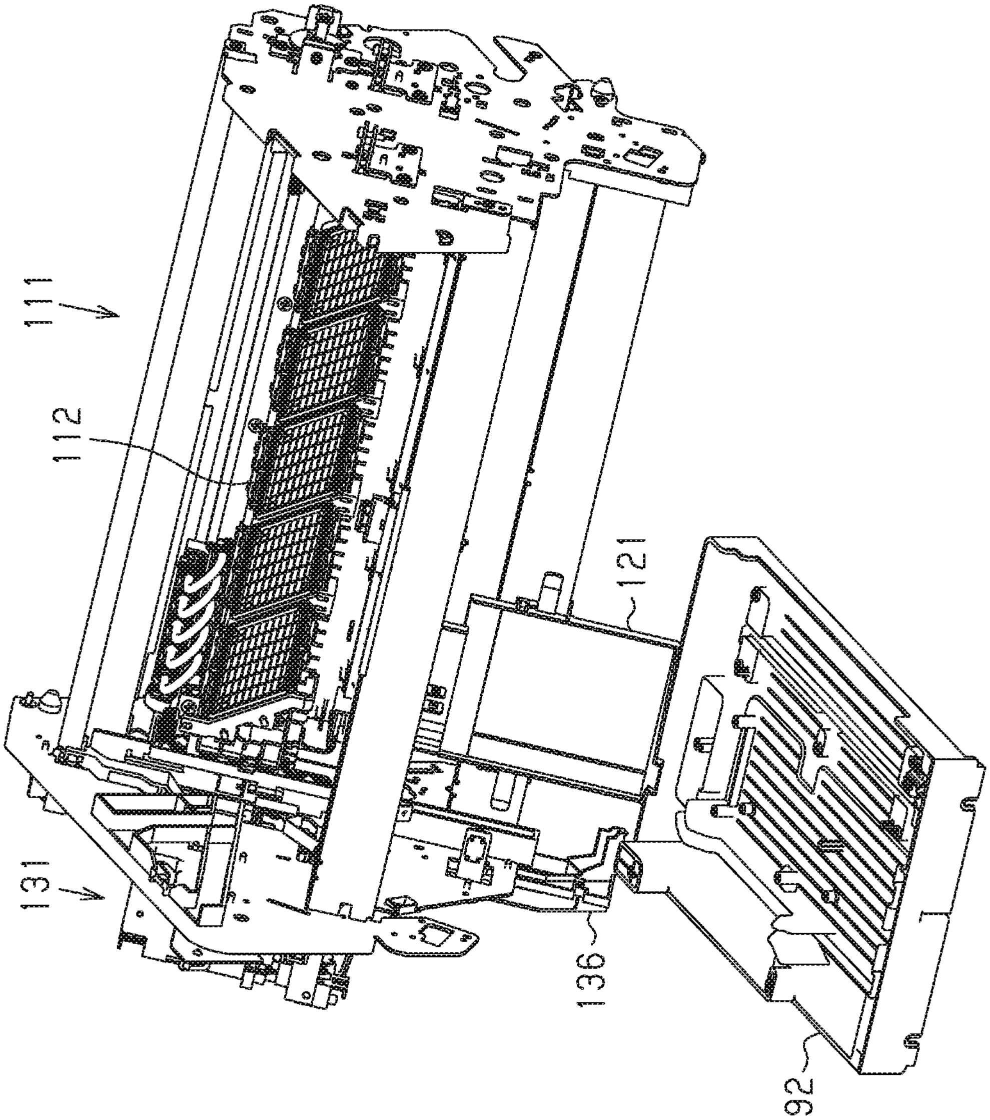
FIG. 13 is a perspective view of a cap unit and a wiping unit.
Figure 14:
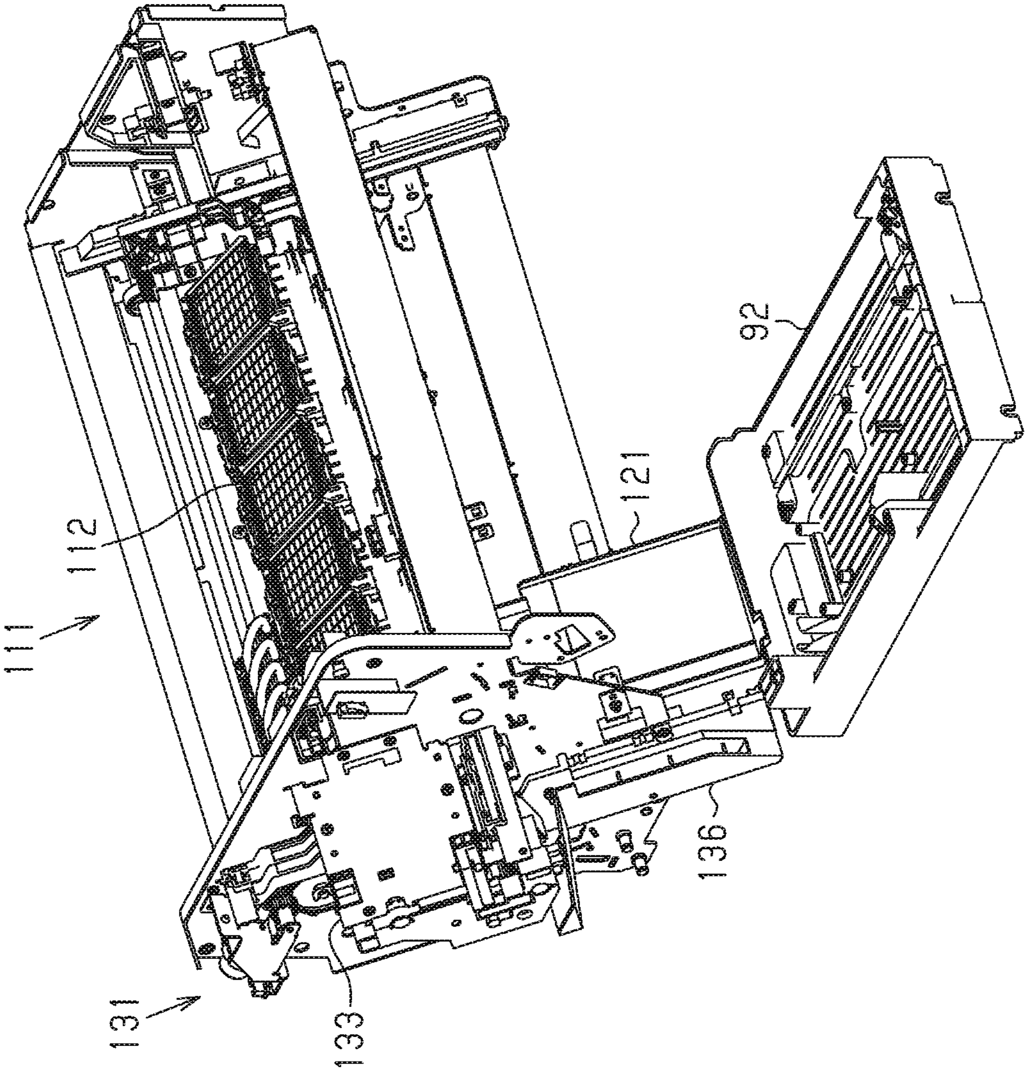
FIG. 14 is a perspective view viewed from a different angle from FIG. 13.
Figure 15:
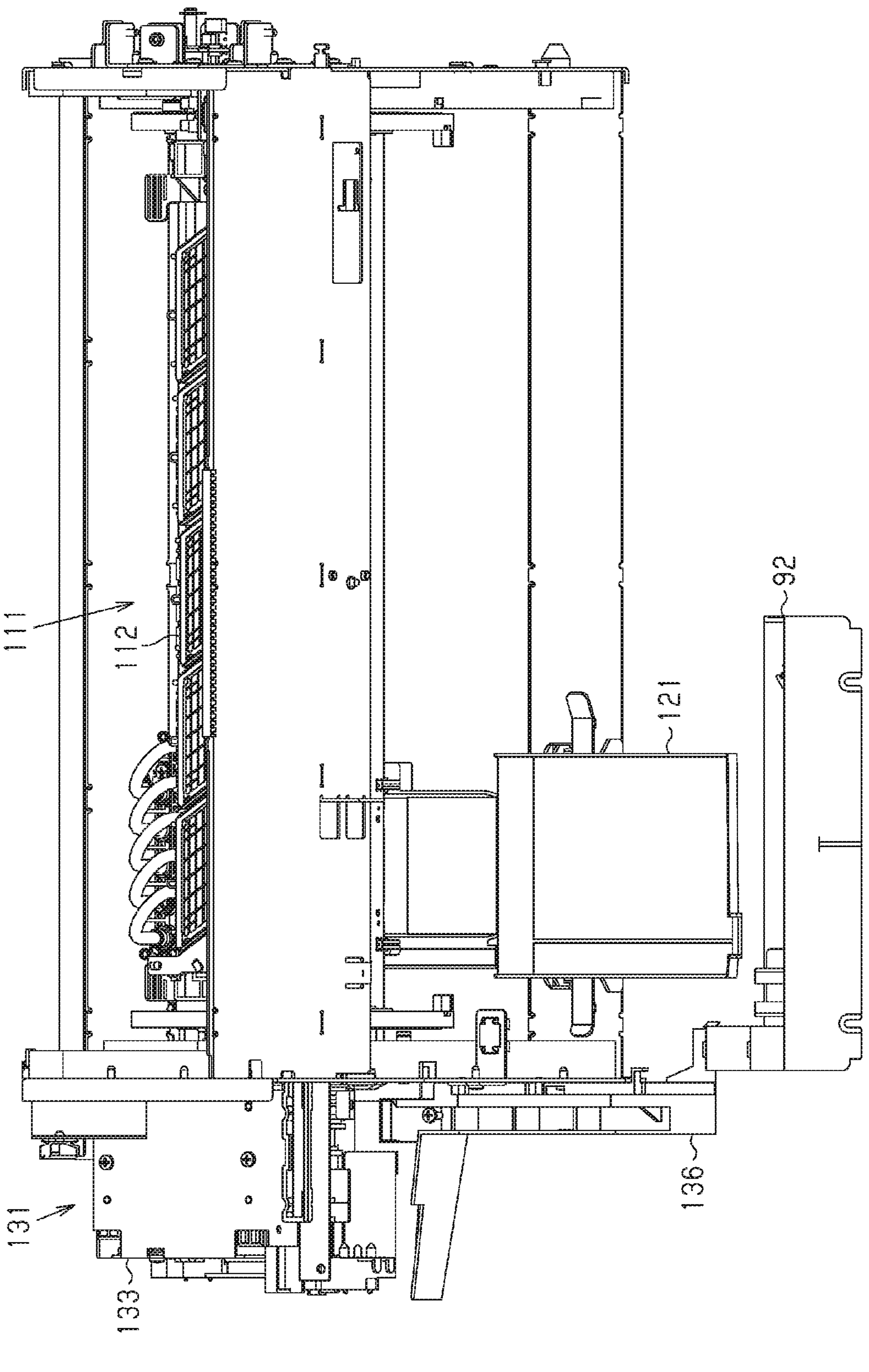
FIG. 15 is a view seen from a different angle from FIGS. 13 and 14.

As illustrated in FIGS. 13, 14, and 15, the cap unit 111 has an ejecting member 121. The ejecting member 121 is a member that ejects the leaked liquid in the cap unit 111, that is, the leaked waste liquid or the leaked moisturizer to the maintenance tray 92. The ejecting member 121 is, for example, a frame extending from the cap 112 toward the maintenance tray 92. The leaked waste liquid or the leaked moisturizer in the cap unit 111 flows from the cap unit 111 to the maintenance tray 92 by flowing along the ejecting member 121.

As illustrated in FIG. 6, the liquid ejecting apparatus 11 includes the wiping unit 131. The wiping unit 131 is a unit for maintaining the head 32.

The wiping unit 131 has a wiping section 132. The wiping section 132 wipes the nozzle surface 34 by coming into contact with the nozzle surface 34. As a result, the wiping section 132 removes the liquid adhering to the nozzle surface 34. The wiping section 132 is, for example, a rubber blade. The wiping section 132 wipes the nozzle surface 34 by moving in a contact state with the nozzle surface 34. In this example, wiping the nozzle surface 34 by the wiping section 132 is called wiping.

The wiping unit 131 has a cleaner 133. The cleaner 133 is a member for cleaning the wiping section 132. When the wiping section 132 performs wiping, the liquid adheres to the wiping section 132. The cleaner 133 collects the liquid adhering to the wiping section 132. As a result, the wiping section 132 can be wiped in a state where the liquid does not adhere to itself. The cleaner 133 stores the liquid as a waste liquid by collecting the liquid from the wiping section 132, for example.

The wiping unit 131 has a wiping flow path 134. The wiping flow path 134 is a flow path through which a liquid mainly flows. The wiping flow path 134 is coupled to the maintenance unit 71.

The wiping flow path 134 has a wiping flow path part 135. The wiping flow path part 135 includes, for example, an elastic tube. The wiping flow path part 135 may include a rigid pipe or may include a flow path formed by a groove carved in the plate.

The wiping flow path 134 extends from, for example, the wiping section 132. The wiping flow path 134 is a flow path for coupling the wiping section 132 to the maintenance unit 71. The waste liquid wiped by the wiping section 132 flows through the wiping flow path 134. The wiping flow path 134 may extend from the cleaner 133. In this case, the waste liquid collected by the cleaner 133 flows through the wiping flow path 134.

As illustrated in FIGS. 13, 14, and 15, the wiping unit 131 has a guide member 136. The guide member 136 is a member that guides the liquid leaked from the wiping unit 131 to the maintenance tray 92. The liquid leaked in the wiping unit 131 is, for example, a liquid that flowed down from the wiping section 132, a liquid that was scattered by the wiping section 132 wiping the nozzle surface 34, a liquid that leaked from the cleaner 133, and the like. The guide member 136 is, for example, a frame extending from the cleaner 133 and the wiping section 132 toward the maintenance tray 92. The liquid leaked in the wiping unit 131 flows from the wiping unit 131 to the maintenance tray 92 by flowing along the guide member 136.

As illustrated in FIG. 6, the liquid ejecting apparatus 11 includes the selector unit 141. The selector unit 141 is a unit configured such that a unit to be opened to the atmosphere can be selected from the supply unit 41 and the maintenance unit 71. That is, the selector unit 141 can open the supply unit 41 to the atmosphere and the maintenance unit 71 to the atmosphere.

The selector unit 141 has a selector valve 142. The selector valve 142 is coupled to the supply unit 41 and the maintenance unit 71. By opening and closing the selector valve 142, a unit to be opened to the atmosphere is selected from the supply unit 41 and the maintenance unit 71.

The selector unit 141 has a decompression pump 143. The decompression pump 143 decompresses other units coupled to the selector unit 141. For example, the decompression pump 143 decompresses the supply unit 41. For example, the decompression pump 143 decompresses the maintenance unit 71.

The selector unit 141 has a pressure sensor 144. The pressure sensor 144 detects the pressure in the selector valve 142. The selector unit 141 controls the selector valve 142 and the decompression pump 143 based on the detection result of the pressure sensor 144.

Figure 16:
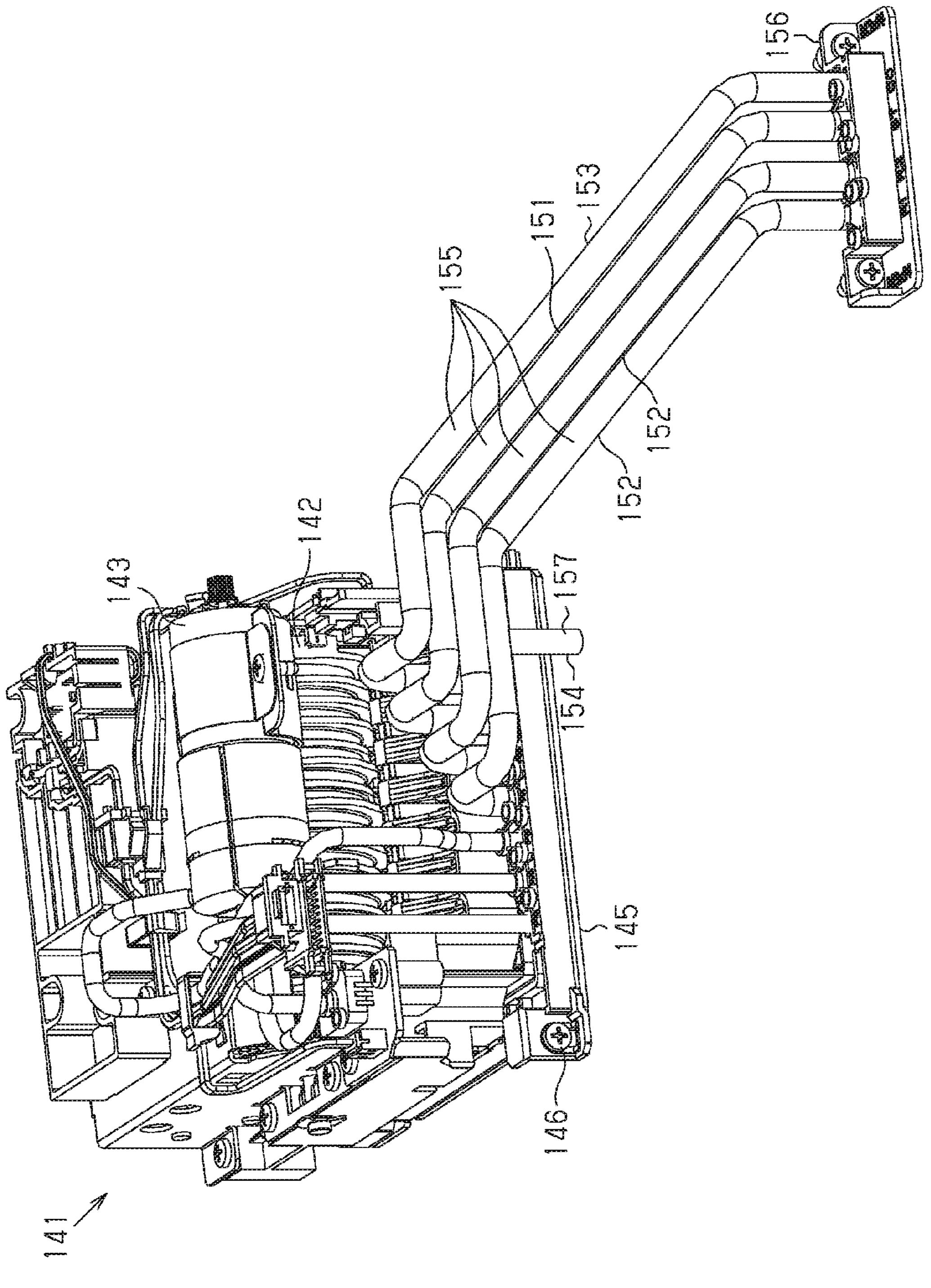
FIG. 16 is a perspective view of a selector unit.

As illustrated in FIG. 16, the selector unit 141 has a support frame 145 that supports the selector valve 142. In this example, the support frame 145 is equipped with the selector valve 142 and the decompression pump 143.

The liquid ejecting apparatus 11 includes a selector fixing member 146 as an example of the fixing member. The selector fixing member 146 fixes the selector unit 141 to the housing 12. The selector fixing member 146 is attached to, for example, the support frame 145. As a result, the selector unit 141 is fixed to the housing 12. When the selector fixing member 146 is removed, the selector unit 141 can be removed from the housing 12. The selector unit 141 is removable through the exposure opening 25.

As illustrated in FIG. 6, the liquid ejecting apparatus 11 includes one or more coupling flow paths. The coupling flow path is a flow path for coupling two units among the supply unit 41, the maintenance unit 71, and the selector unit 141. In this example, the coupling flow path includes a flow path for coupling the supply unit 41 and the selector unit 141, and a flow path for coupling the maintenance unit 71 and the selector unit 141.

The liquid ejecting apparatus 11 includes a first coupling flow path 151, a second coupling flow path 152, a third coupling flow path 153, and a fourth coupling flow path 154. The first coupling flow path 151, the second coupling flow path 152, the third coupling flow path 153, and the fourth coupling flow path 154 are flow paths through which gas flows. The first coupling flow path 151, the second coupling flow path 152, the third coupling flow path 153, and the fourth coupling flow path 154 are coupled to the selector valve 142. The first coupling flow path 151, the second coupling flow path 152, the third coupling flow path 153, and the fourth coupling flow path 154 can be opened and closed by the selector valve 142.

The first coupling flow path 151 is a flow path for coupling the selector unit 141 and the supply unit 41. The second coupling flow path 152 is a flow path for coupling the selector unit 141 and the supply unit 41. The third coupling flow path 153 is a flow path for coupling the selector unit 141 and the supply unit 41. The fourth coupling flow path 154 is a flow path for coupling the selector unit 141 and the maintenance unit 71. The selector unit 141 opens the supply unit 41, the maintenance unit 71, or both to the atmosphere through the first coupling flow path 151, the second coupling flow path 152, the third coupling flow path 153, and the fourth coupling flow path 154.

The first coupling flow path 151, the second coupling flow path 152, and the third coupling flow path 153 each have a first flow path part 155. The first flow path part 155 includes, for example, an elastic tube. The first flow path part 155 may include a rigid pipe or may include a flow path formed by a groove carved in the plate.

The first coupling flow path 151, the second coupling flow path 152, and the third coupling flow path 153 have a joint. The first coupling flow path 151, the second coupling flow path 152, and the third coupling flow path 153 have a common first coupling joint 156. The first coupling joint 156 is positioned at one end of the first flow path part 155. The first coupling joint 156 constitutes one end of the first coupling flow path 151, one end of the second coupling flow path 152, and one end of the third coupling flow path 153. The first coupling flow path 151, the second coupling flow path 152, and the third coupling flow path 153 may have different joints.

The first coupling joint 156 is coupled to the second supply joint 56. As a result, the first coupling flow path 151 is coupled to the third supply flow path 50. The second coupling flow path 152 is coupled to the fourth supply flow path 51. The third coupling flow path 153 is coupled to the fifth supply flow path 52. Therefore, the first coupling flow path 151 couples the selector valve 142 and the first tank 45. The second coupling flow path 152 couples the selector valve 142 and the second tank 46. The third coupling flow path 153 couples the selector valve 142 and the pressurizing section 57.

The first flow path part 155 may be directly coupled to the second supply joint 56. The gas flow path part 55 may be directly coupled to the first coupling joint 156. The second supply joint 56 and the first coupling joint 156 make it simple to couple the first coupling flow path 151, the second coupling flow path 152, and the third coupling flow path 153 to the supply unit 41. That is, the second supply joint 56 and the first coupling joint 156 make it simple to couple the supply unit 41 and the selector unit 141.

When the first coupling flow path 151 is opened by the selector valve 142, the first tank 45 is opened to the atmosphere. When the second coupling flow path 152 is opened by the selector valve 142, the second tank 46 is opened to the atmosphere. When the third coupling flow path 153 is opened by the selector valve 142, the pressurizing section 57 is opened to the atmosphere.

When the decompression pump 143 is driven, the pressure is reduced in the first tank 45 through the first coupling flow path 151. As a result, for example, the liquid flows from the head 32 to the first tank 45 through the first supply flow path 48. When the decompression pump 143 is driven, the pressure is reduced in the second tank 46 through the second coupling flow path 152. As a result, for example, the liquid flows from the first tank 45 to the second tank 46 through the tank valve 47. When the decompression pump 143 is driven, the pressure is reduced in the pressurizing section 57 through the third coupling flow path 153. After that, when the pressurizing section 57 is opened to the atmosphere through the third coupling flow path 153, the pressurizing section 57 pressurizes the liquid in the head 32. In this manner, the decompression pump 143 drives the pressurizing section 57.

The fourth coupling flow path 154 has a second flow path part 157. The second flow path part 157 includes, for example, an elastic tube. The second flow path part 157 may include a rigid pipe or may include a flow path formed by a groove carved in the plate.

The fourth coupling flow path 154 has a joint. The fourth coupling flow path 154 has a second coupling joint 158. The second coupling joint 158 is positioned at one end of the second flow path part 157. The second coupling joint 158 constitutes one end of the fourth coupling flow path 154.

The second coupling joint 158 is coupled to the maintenance joint 80. As a result, the fourth coupling flow path 154 is coupled to the first maintenance flow path 74. Therefore, the fourth coupling flow path 154 couples the selector valve 142 and the moisturizer tank 72.

The second flow path part 157 may be directly coupled to the maintenance joint 80. The maintenance flow path part 79 may be directly coupled to the second coupling joint 158. The maintenance joint 80 and the second coupling joint 158 make it simple to couple the fourth coupling flow path 154 to the maintenance unit 71. That is, the maintenance joint 80 and the second coupling joint 158 make it simple to couple the maintenance unit 71 and the selector unit 141.

When the fourth coupling flow path 154 is opened by the selector valve 142, the moisturizer tank 72 is opened to the atmosphere. When the decompression pump 143 is driven, the pressure is reduced in the moisturizer tank 72 through the fourth coupling flow path 154. As a result, for example, the moisturizer flows from the cap 112 to the moisturizer tank 72 through the second maintenance flow path 75.

The first coupling flow path 151, the second coupling flow path 152, the third coupling flow path 153, and the fourth coupling flow path 154 are not limited to one end, and may have joints at both ends thereof. In this case, the coupling of the first coupling flow path 151, the second coupling flow path 152, the third coupling flow path 153, and the fourth coupling flow path 154 to the selector unit 141 becomes simple. Accordingly, the coupling between the selector unit 141 and other units becomes simple.

The liquid ejecting apparatus 11 includes a first relay flow path 161, a second relay flow path 162, a third relay flow path 163, and a fourth relay flow path 164. The first relay flow path 161, the second relay flow path 162, the third relay flow path 163, and the fourth relay flow path 164 are mainly flow paths through which the liquid flows.

The first relay flow path 161 is a flow path for coupling the maintenance unit 71 and the wiping unit 131. The second relay flow path 162, the third relay flow path 163, and the fourth relay flow path 164 are flow paths for coupling the maintenance unit 71 and the cap unit 111.

The first relay flow path 161, the second relay flow path 162, the third relay flow path 163, and the fourth relay flow path 164 each have a relay flow path part 165. The relay flow path part 165 includes, for example, an elastic tube. The relay flow path part 165 may include a rigid pipe or may include a flow path formed by a groove carved in the plate.

The first relay flow path 161, the second relay flow path 162, the third relay flow path 163, and the fourth relay flow path 164 have joints. The first relay flow path 161, the second relay flow path 162, the third relay flow path 163, and the fourth relay flow path 164 have joints at both ends thereof.

The first relay flow path 161, the second relay flow path 162, the third relay flow path 163, and the fourth relay flow path 164 have a common second coupling joint 158. That is, the first relay flow path 161, the second relay flow path 162, the third relay flow path 163, and the fourth relay flow path 164 share the fourth coupling flow path 154 and the second coupling joint 158. The first relay flow path 161, the second relay flow path 162, the third relay flow path 163, and the fourth relay flow path 164 have a common relay joint 166.

The second coupling joint 158 is positioned at one end of the first relay flow path 161 and the relay joint 166 is positioned at the other end of the first relay flow path 161. The second coupling joint 158 is positioned at one end of the second relay flow path 162, and the relay joint 166 is positioned at the other end of the second relay flow path 162. The second coupling joint 158 is positioned at one end of the third relay flow path 163, and the relay joint 166 is positioned at the other end of the third relay flow path 163. The second coupling joint 158 is positioned at one end of the fourth relay flow path 164, and the relay joint 166 is positioned at the other end of the fourth relay flow path 164.

The second coupling joint 158 constitutes one end of the first relay flow path 161, one end of the second relay flow path 162, one end of the third relay flow path 163, and one end of the fourth relay flow path 164. The relay joint 166 constitutes the other end of the first relay flow path 161, the other end of the second relay flow path 162, the other end of the third relay flow path 163, and the other end of the fourth relay flow path 164. The first relay flow path 161, the second relay flow path 162, the third relay flow path 163, and the fourth relay flow path 164 may have different joints, respectively.

The second coupling joint 158 is coupled to the maintenance joint 80. As a result, the first relay flow path 161 is coupled to the fifth maintenance flow path 78. The second relay flow path 162 is coupled to the fourth maintenance flow path 77. The third relay flow path 163 is coupled to the second maintenance flow path 75. The fourth relay flow path 164 is coupled to the third maintenance flow path 76.

The first cap flow path 116, the second cap flow path 117, the third cap flow path 118, and the wiping flow path 134 are coupled to the relay joint 166. As a result, the first relay flow path 161 is coupled to the wiping flow path 134. The second relay flow path 162 is coupled to the first cap flow path 116. The third relay flow path 163 is coupled to the second cap flow path 117. The fourth relay flow path 164 is coupled to the third cap flow path 118.

The first relay flow path 161 relays between the fifth maintenance flow path 78 and the wiping flow path 134. That is, the first relay flow path 161 couples the maintenance unit 71 and the wiping unit 131. The maintenance unit 71 and the wiping unit 131 are coupled via the first relay flow path 161. The first relay flow path 161 couples the wiping section 132 and the mounting body 103.

The second relay flow path 162 relays between the fourth maintenance flow path 77 and the first cap flow path 116. That is, the second relay flow path 162 couples the maintenance unit 71 and the cap unit 111. The maintenance unit 71 and the cap unit 111 are coupled via the second relay flow path 162. The second relay flow path 162 couples the cap 112 and the buffer tank 73.

The third relay flow path 163 relays between the second maintenance flow path 75 and the second cap flow path 117. That is, the third relay flow path 163 couples the maintenance unit 71 and the cap unit 111. The maintenance unit 71 and the cap unit 111 are coupled via the third relay flow path 163. The third relay flow path 163 couples the cap 112 and the moisturizer tank 72.

The fourth relay flow path 164 relays between the third maintenance flow path 76 and the third cap flow path 118. That is, the fourth relay flow path 164 couples the maintenance unit 71 and the cap unit 111. The maintenance unit 71 and the cap unit 111 are coupled via the fourth relay flow path 164. The fourth relay flow path 164 couples the cap 112 and the moisturizer tank 72. The fourth relay flow path 164 couples the cap 112 and the mounting body 103.

The relay flow path part 165 may be directly coupled to the maintenance joint 80. The maintenance flow path part 79 may be directly coupled to the second coupling joint 158. The maintenance joint 80 and the second coupling joint 158 make it simple to attach and detach the maintenance unit 71 and the selector unit 141. Further, the maintenance joint 80 and the second coupling joint 158 make it simple to attach and detach the maintenance unit 71 and the cap unit 111. Further, the maintenance joint 80 and the second coupling joint 158 make it simple to attach and detach the maintenance unit 71 and the wiping unit 131.

The cap flow path part 119 may be directly coupled to the maintenance joint 80. That is, the maintenance unit 71 may be directly coupled to the cap unit 111. Further, the wiping flow path part 135 may be directly coupled to the maintenance joint 80. That is, the maintenance unit 71 may be directly coupled to the wiping unit 131. In such a case, the relay flow path becomes unnecessary.

As illustrated in FIG. 16, in this example, two second coupling flow paths 152 extend from the selector valve 142. This is because one second coupling flow path 152 corresponds to two liquid accommodating bodies 43. That is, one second coupling flow path 152 is coupled to two second tanks 46. The first coupling flow path 151 is coupled to four first tanks 45.

Figure 17:
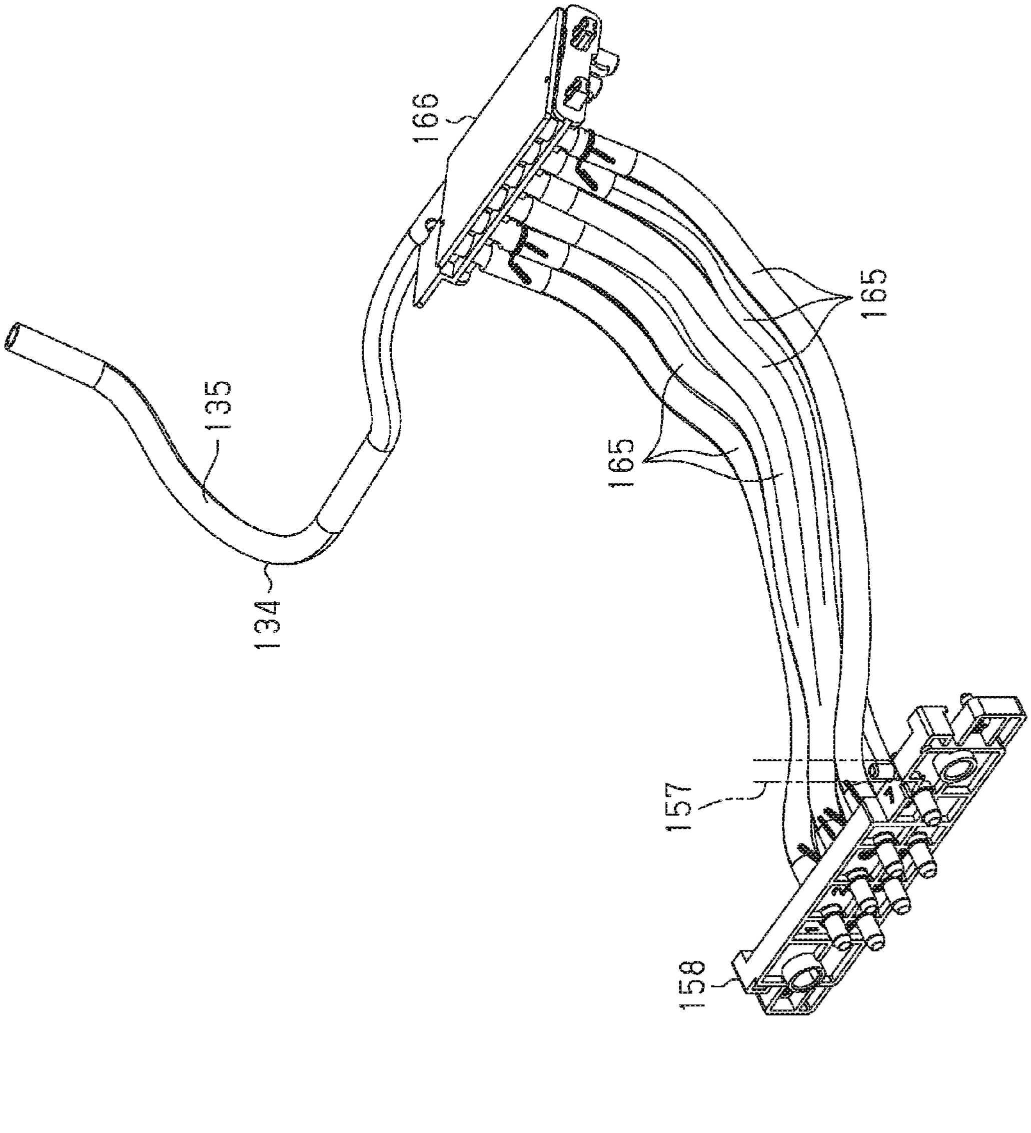
FIG. 17 is a perspective view of a first relay flow path to a fourth relay flow path.

As illustrated in FIG. 17, in this example, the second coupling joint 158 and the relay joint 166 are coupled by six relay flow path parts 165. Among the six relay flow path parts 165, three relay flow path parts 165 each constitute a second relay flow path 162. That is, in this example, the selector unit 141 has three second relay flow paths 162. Therefore, in this example, the cap unit 111 has three first cap flow paths 116. The three first cap flow paths 116 may be coupled to one cap 112 or may be coupled to different caps 112. The remaining three relay flow path parts 165 constitute a first relay flow path 161, a third relay flow path 163, and a fourth relay flow path 164, respectively.

Next, replacement of the unit will be described.

The supply unit 41, the maintenance unit 71, and the selector unit 141 can be replaced through the exposure opening 25. That is, the supply unit 41, the maintenance unit 71, and the selector unit 141 can be replaced through one opening. By integrating the openings, from which the supply unit 41, the maintenance unit 71, and the selector unit 141 are taken out, into the exposure opening 25, the work efficiency of the worker who replaces the unit is improved. In this example, in addition to the supply unit 41, the maintenance unit 71, and the selector unit 141, the mounting unit 101 is also replaceable through the exposure opening 25. The worker replaces the unit by taking the unit out of the exposure opening 25 and then inserting a new unit through the exposure opening 25.

Figure 18:
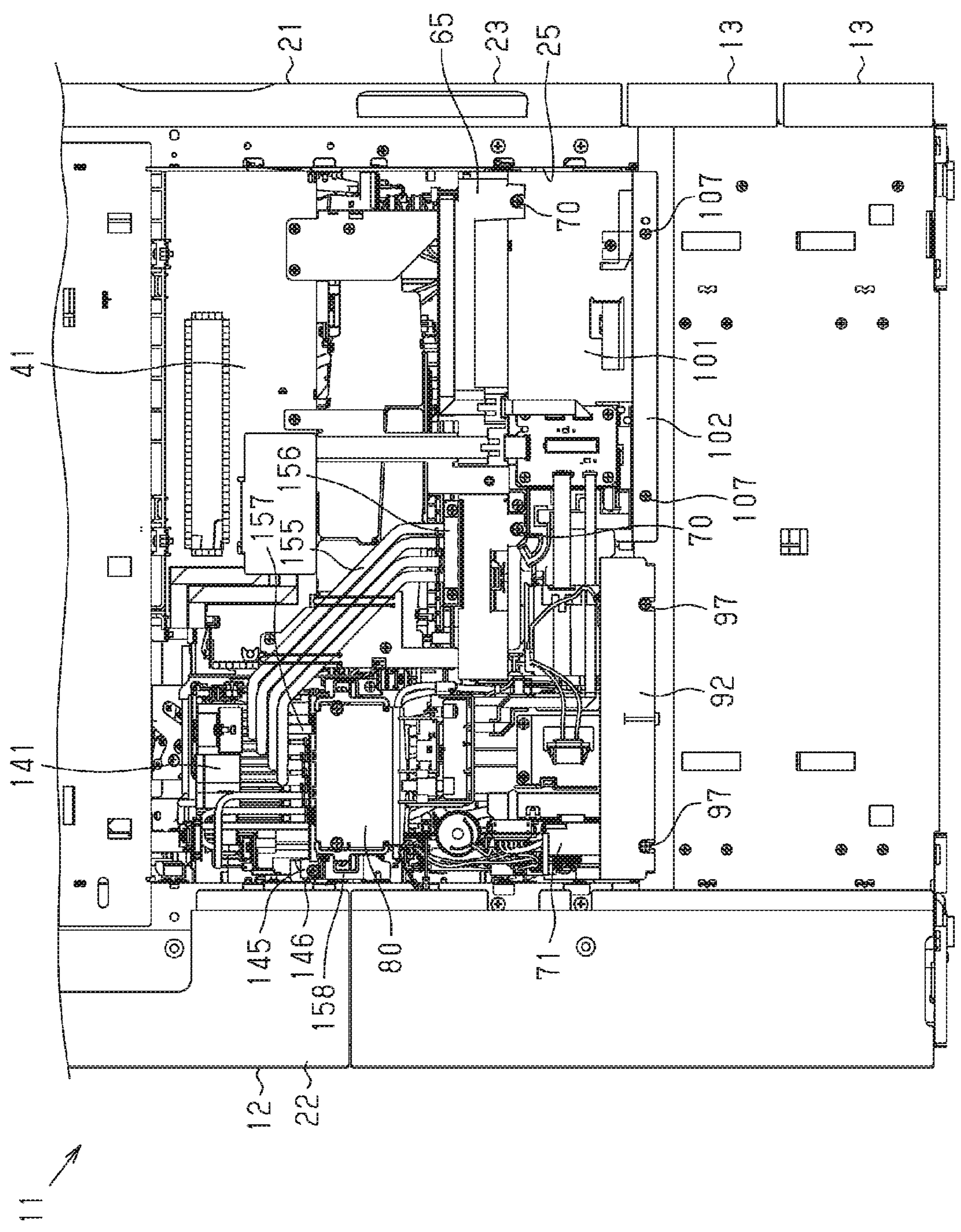
FIG. 18 is a view of an exposure opening viewed from a position facing an opening surface.

As illustrated in FIG. 18, the supply unit 41, the maintenance unit 71, and the selector unit 141 are exposed from the exposure opening 25. When the exposure opening 25 is viewed from a position facing the opening surface 22, the supply unit 41 is arranged side by side with the selector unit 141. The supply unit 41 is arranged side by side with the maintenance unit 71 and is positioned above the maintenance unit 71. The maintenance unit 71 is positioned below the selector unit 141.

When the exposure opening 25 is viewed from a position facing the opening surface 22, the supply unit 41, the maintenance unit 71, and the selector unit 141 are positioned not to overlap each other. Therefore, when one of the supply unit 41, the maintenance unit 71, and the selector unit 141 is taken out of the exposure opening 25, one unit does not interfere with the other unit. For example, when the supply unit 41 is taken out of the exposure opening 25, the supply unit 41 does not interfere with the maintenance unit 71 and the selector unit 141. Accordingly, it is not necessary to take out another unit in order to take out one unit. Therefore, each of the supply unit 41, the maintenance unit 71, and the selector unit 141 can be individually taken out of the exposure opening 25. Therefore, the supply unit 41, the maintenance unit 71, and the selector unit 141 can be easily replaced.

The mounting unit 101 is exposed from the exposure opening 25. When the exposure opening 25 is viewed from a position facing the opening surface 22, the mounting unit 101 is arranged side by side with the maintenance unit 71. The mounting unit 101 is positioned below the supply unit 41.

When the exposure opening 25 is viewed from a position facing the opening surface 22, the mounting unit 101 is positioned not to overlap the supply unit 41, the maintenance unit 71, and the selector unit 141. Therefore, when the mounting unit 101 is taken out of the exposure opening 25, the mounting unit 101 does not interfere with the supply unit 41, the maintenance unit 71, and the selector unit 141. Therefore, each of the supply unit 41, the maintenance unit 71, the selector unit 141, and the mounting unit 101 can be individually taken out of the exposure opening 25. Therefore, in addition to the supply unit 41, the maintenance unit 71, and the selector unit 141, the mounting unit 101 can be easily replaced.

One end of the coupling flow path is exposed from the exposure opening 25. When the exposure opening 25 is viewed from a position facing the opening surface 22, one end of the coupling flow path is exposed. For example, one end of the first coupling flow path 151, one end of the second coupling flow path 152, and one end of the third coupling flow path 153 are exposed from the exposure opening 25. Therefore, it is easy to access one end of the first coupling flow path 151, one end of the second coupling flow path 152, and one end of the third coupling flow path 153 from the exposure opening 25. As a result, the first coupling flow path 151, the second coupling flow path 152, and the third coupling flow path 153 can be easily removed from the supply unit 41 or the selector unit 141.

The first coupling flow path 151, the second coupling flow path 152, and the third coupling flow path 153 include the elastic first flow path part 155. Therefore, the first flow path part 155 can be deformed. As a result, when one unit is taken out of the exposure opening 25, the first flow path part 155 can be deformed such that the first coupling flow path 151, the second coupling flow path 152, and the third coupling flow path 153 do not interfere with the unit. For example, when the supply unit 41 or the selector unit 141 is taken out of the exposure opening 25, the first flow path part 155 can be deformed such that the first coupling flow path 151, the second coupling flow path 152, and the third coupling flow path 153 do not interfere with the unit.

One end of the fourth coupling flow path 154 is exposed from the exposure opening 25. Therefore, it is easy to access one end of the fourth coupling flow path 154 from the exposure opening 25. As a result, the fourth coupling flow path 154 can be easily removed from the maintenance unit 71 or the selector unit 141.

The fourth coupling flow path 154 includes the elastic second flow path part 157. Therefore, the second flow path part 157 can be deformed. Thereby, when one unit is taken out of the exposure opening 25, the second flow path part 157 can be deformed such that the fourth coupling flow path

154 does not interfere with the unit. For example, when the maintenance unit 71 or the selector unit 141 is taken out of the exposure opening 25, the second flow path part 157 can be deformed such that the fourth coupling flow path 154 does not interfere with the unit.

When the fourth coupling flow path 154 is removed from the maintenance unit 71, the second coupling joint 158 may be removed from the maintenance joint 80, or the second flow path part 157 may be removed from the second coupling joint 158.

In this example, not only one end of the coupling flow path but also both ends of the coupling flow path are exposed from the exposure opening 25. Specifically, both ends of the first coupling flow path 151, both ends of the second coupling flow path 152, both ends of the third coupling flow path 153, and both ends of the fourth coupling flow path 154 are exposed from the exposure opening 25. Therefore, it is easy to access both ends of the first coupling flow path 151, both ends of the second coupling flow path 152, both ends of the third coupling flow path 153, and both ends of the fourth coupling flow path 154 from the exposure opening 25. As a result, from the exposure opening 25, the first coupling flow path 151, the second coupling flow path 152, the third coupling flow path 153, and the fourth coupling flow path 154 can be easily removed from the unit.

By removing both ends of the coupling flow path from the two units through the exposure opening 25, even when the first flow path part 155 and the second flow path part 157 do not have elasticity, and when the unit is taken out of the exposure opening 25, there is no concern that the coupling flow path interferes with the unit.

The plurality of fixing members are exposed from the exposure opening 25. For example, when the exposure opening 25 is viewed from a position facing the opening surface 22, a plurality of fixing members are exposed from the exposure opening 25. Specifically, the supply fixing member 70, the maintenance fixing member 97, and the selector fixing member 146 are exposed from the exposure opening 25. In addition, the mounting fixing member 107 is also exposed from the exposure opening 25.

In this example, the supply tray 65 is exposed from the exposure opening 25. Therefore, the supply fixing member 70 attached to the supply tray 65 is exposed from the exposure opening 25.

In this example, the maintenance tray 92 is exposed from the exposure opening 25. Therefore, the maintenance fixing member 97 attached to the maintenance tray 92 is exposed from the exposure opening 25.

In this example, the support frame 145 is exposed from the exposure opening 25. Therefore, the selector fixing member 146 attached to the support frame 145 is exposed from the exposure opening 25.

In this example, the mounting section 102 is exposed from the exposure opening 25. Therefore, the mounting fixing member 107 attached to the mounting section 102 is exposed from the exposure opening 25.

The supply fixing member 70, the maintenance fixing member 97, the mounting fixing member 107, and the selector fixing member 146 are exposed from the exposure opening 25. Therefore, the supply fixing member 70, the maintenance fixing member 97, the mounting fixing member 107, and the selector fixing member 146 can be easily accessed from the exposure opening 25. Accordingly, it is easy to remove the supply fixing member 70, the maintenance fixing member 97, the mounting fixing member 107, and the selector fixing member 146. Therefore, it is easy to replace the unit.

When removing the supply unit 41 through the exposure opening 25, the worker removes the supply fixing member 70. The worker further removes the first supply joint 54 and the head joint 38. The worker further removes the second supply joint 56 and the first coupling joint 156. As a result, the worker can remove the supply unit 41 through the exposure opening 25.

When removing the maintenance unit 71 through the exposure opening 25, the worker removes the maintenance fixing member 97. The worker further removes the maintenance joint 80 and the second coupling joint 158. The worker further removes the mounting body 103 from the mounting section 102. As a result, the worker can remove the maintenance unit 71 through the exposure opening 25.

When the worker removes the selector unit 141 through the exposure opening 25, the worker removes the selector fixing member 146. The worker further removes the first coupling joint 156 and the second supply joint 56. The worker further removes the second flow path part 157 from the second coupling joint 158. As a result, the worker can remove the selector unit 141 through the exposure opening 25. The worker may remove the selector unit 141 through the exposure opening 25 by removing the first coupling flow path 151, the second coupling flow path 152, the third coupling flow path 153, and the fourth coupling flow path 154 from the selector valve 142. The worker may remove the selector unit 141 through the exposure opening 25 by removing the second coupling joint 158 and the maintenance joint 80. In this case, the worker removes, for example, the relay flow path part 165 from the second coupling joint 158 or the relay joint 166.

When removing the mounting unit 101 through the exposure opening 25, the worker removes the mounting fixing member 107. The worker further removes the mounting body 103 from the mounting section 102. As a result, the worker can remove the mounting unit 101 through the exposure opening 25.

Figure 19:
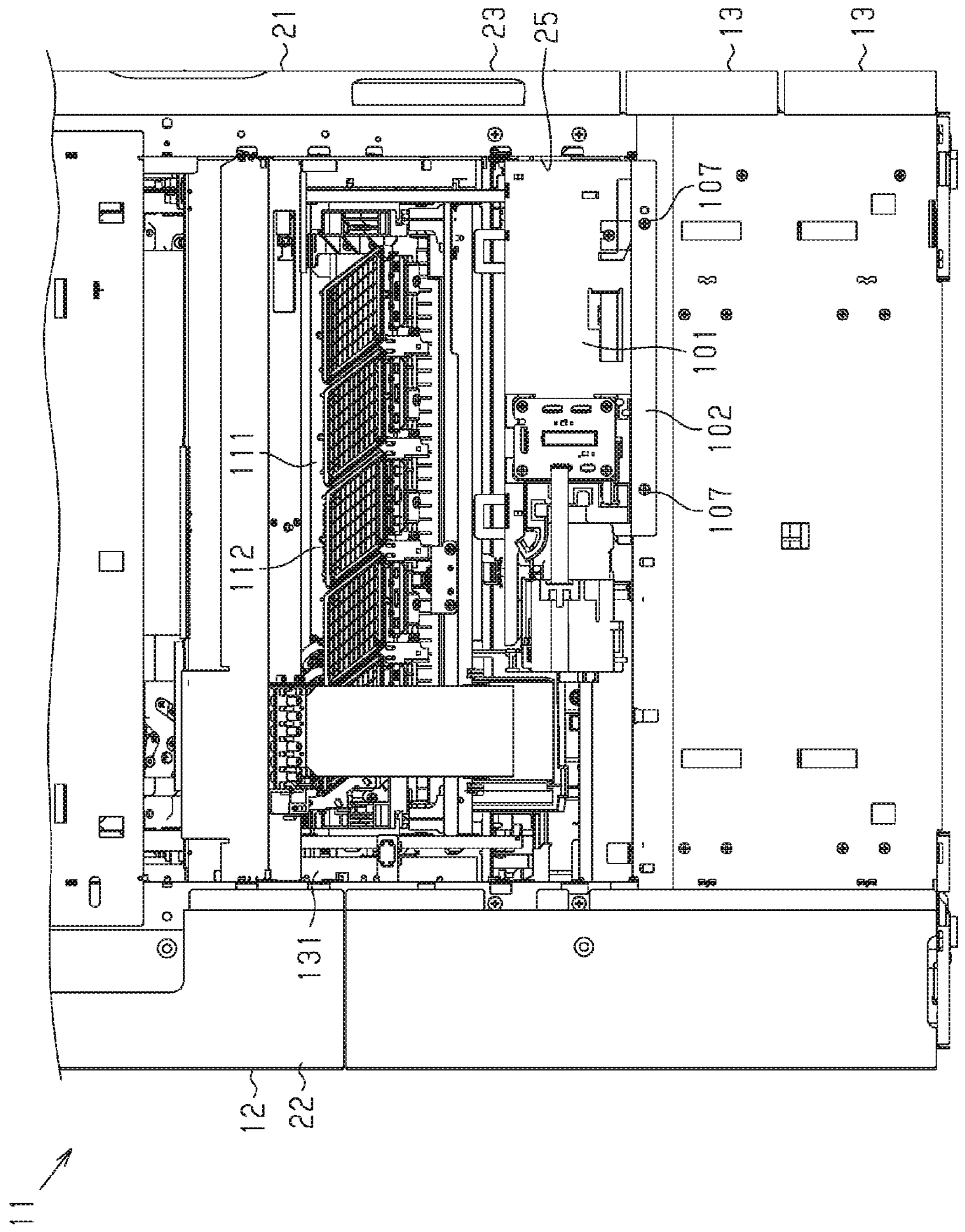
FIG. 19 is a diagram in which the supply unit, the maintenance unit, and the selector unit are removed from FIG. 18.

As illustrated in FIG. 19, when the supply unit 41, the maintenance unit 71, and the selector unit 141 are removed, the cap unit 111 is exposed from the exposure opening 25. That is, when the exposure opening 25 is viewed from a position facing the opening surface 22, the cap unit 111 is positioned to overlap at least one of the supply unit 41, the maintenance unit 71, and the selector unit 141. When the exposure opening 25 is viewed from a position facing the opening surface 22, the cap unit 111 is positioned behind the supply unit 41, the maintenance unit 71, and the selector unit 141. Therefore, it is possible to suppress an increase in the size of the liquid ejecting apparatus 11 as compared with the case where there is no overlap. Further, when the cap unit 111 is configured to be taken out of the exposure opening 25, the unit that overlaps with the cap unit 111 among the supply unit 41, the maintenance unit 71, and the selector unit 141 is taken out of the exposure opening 25, the cap unit 111 can be accessed from the exposure opening 25.

When the supply unit 41, the maintenance unit 71, and the selector unit 141 are removed, the wiping unit 131 is exposed from the exposure opening 25. That is, when the exposure opening 25 is viewed from a position facing the opening surface 22, the wiping unit 131 is positioned to overlap at least one unit among the supply unit 41, the maintenance unit 71, and the selector unit 141. When the exposure opening 25 is viewed from a position facing the opening surface 22, the wiping unit 131 is positioned behind the supply unit 41, the maintenance unit 71, and the selector unit 141. Therefore, it is possible to suppress an increase in the size of the liquid ejecting apparatus 11 as compared with the case where there is no overlap. Further, when the wiping unit 131 is taken out of the exposure opening 25, the unit that overlaps the wiping unit 131 among the supply unit 41, the maintenance unit 71, and the selector unit 141 is taken out of the exposure opening 25, and accordingly, the wiping unit 131 can be accessed from the exposure opening 25.

When the exposure opening 25 is viewed from a position facing the opening surface 22, the cap unit 111 and the wiping unit 131 are arranged side by side. In this manner, when the exposure opening 25 is viewed from a position facing the opening surface 22, the cap unit 111 and the wiping unit 131 are positioned not to overlap each other. Therefore, when accessing one unit of the cap unit 111 and the wiping unit 131 from the exposure opening 25, the other unit does not interfere with the access. As a result, the cap unit 111 and the wiping unit 131 can be individually accessed from the exposure opening 25.

Next, the operation and effect of the above embodiment will be described.

1. The exposure opening 25 exposes the supply unit 41, the maintenance unit 71, and the selector unit 141. When the exposure opening 25 is viewed from a position facing the opening surface 22, the supply unit 41, the maintenance unit 71, and the selector unit 141 are positioned not to overlap each other.

According to the above configuration, when one unit among the supply unit 41, the maintenance unit 71, and the selector unit 141 is taken out of the exposure opening 25, the unit does not interfere with the other unit. Therefore, when one unit is taken out of the exposure opening 25, it is not necessary to take out another unit. That is, the supply unit 41, the maintenance unit 71, and the selector unit 141 can be individually taken out of the exposure opening 25. Therefore, it is easy to replace the unit.

2. The first coupling flow path 151, the second coupling flow path 152, and the third coupling flow path 153 include the elastic first flow path part 155. The fourth coupling flow path 154 includes the elastic second flow path part 157. One end of the first coupling flow path 151, one end of the second coupling flow path 152, one end of the third coupling flow path 153, and one end of the fourth coupling flow path 154 are exposed from the exposure opening 25.

According to the above configuration, one end of the first coupling flow path 151, one end of the second coupling flow path 152, one end of the third coupling flow path 153, and one end of the fourth coupling flow path 154 are easily accessed through the exposure opening 25. Therefore, for example, the first coupling flow path 151, the second coupling flow path 152, the third coupling flow path 153, and the fourth coupling flow path 154 can be easily removed from one unit. Further, since the first flow path part 155 and the second flow path part 157 have elasticity, these parts can be deformed. As a result, when one unit is taken out of the exposure opening 25, the first flow path part 155 and the second flow path part 157 can be deformed such that the first coupling flow path 151, the second coupling flow path 152, the third coupling flow path 153, and the fourth coupling flow path 154 do not interfere with the supply unit 41, the maintenance unit 71, and the selector unit 141. Therefore, it is easy to replace the unit.

3. Both ends of the first coupling flow path 151, both ends of the second coupling flow path 152, both ends of the third coupling flow path 153, and both ends of the fourth coupling flow path 154 are exposed from the exposure opening 25.

According to the above configuration, both ends of the first coupling flow path 151, both ends of the second coupling flow path 152, both ends of the third coupling flow path 153, and both ends of the fourth coupling flow path 154 are easily accessed through the exposure opening 25. Therefore, for example, the first coupling flow path 151, the second coupling flow path 152, the third coupling flow path 153, and the fourth coupling flow path 154 can be easily removed from both units. By removing both ends of the first coupling flow path 151, both ends of the second coupling flow path 152, both ends of the third coupling flow path 153, and both ends of the fourth coupling flow path 154 from the unit, the first coupling flow path 151, the second coupling flow path 152, the third coupling flow path 153, and the fourth coupling flow path 154 can be taken out of the exposure opening 25. As a result, when one unit is taken out of the exposure opening 25, there is no concern that the first coupling flow path 151, the second coupling flow path 152, the third coupling flow path 153, and the fourth coupling flow path 154 interfere with the supply unit 41, the maintenance unit 71, and the selector unit 141. Therefore, it is easy to replace the unit.

4. When the exposure opening 25 is viewed from the position facing the opening surface 22, the cap unit 111 is positioned to overlap at least one of the supply unit 41, the maintenance unit 71, and the selector unit 141.

According to the above configuration, the size expansion of the liquid ejecting apparatus 11 can be suppressed as compared with the case where the cap unit 111 does not overlap at least one of the supply unit 41, the maintenance unit 71, and the selector unit 141. Further, when the cap unit 111 is taken out of the exposure opening 25, the cap unit 111 can be accessed from the exposure opening 25 by removing the unit that overlaps the cap unit 111. That is, the cap unit 111 can be accessed in addition to the supply unit 41, the maintenance unit 71, and the selector unit 141 through the exposure opening 25. In this manner, the opening that can access the supply unit 41, the maintenance unit 71, and the selector unit 141, and the opening that can access the cap unit 111 are integrated as the exposure opening 25. Therefore, workability is improved when the unit is replaced or repaired.

5. When the exposure opening 25 is viewed from the position facing the opening surface 22, the wiping unit 131 is positioned to overlap at least one of the supply unit 41, the maintenance unit 71, and the selector unit 141.

According to the above configuration, the size expansion of the liquid ejecting apparatus 11 can be suppressed as compared with the case where the wiping unit 131 does not overlap at least one of the supply unit 41, the maintenance unit 71, and the selector unit 141. Further, when the wiping unit 131 is taken out of the exposure opening 25, the wiping unit 131 can be accessed from the exposure opening 25 by removing the unit that overlaps the wiping unit 131. That is, in addition to the supply unit 41, the maintenance unit 71, and the selector unit 141, the wiping unit 131 can also be accessed through the exposure opening 25. In this manner, the opening that can access the supply unit 41, the maintenance unit 71, and the selector unit 141, and the opening that can access the wiping unit 131 are integrated as the exposure opening 25. Therefore, workability is good when the unit is replaced or repaired.

6. When the exposure opening 25 is viewed from the position facing the opening surface 22, the cap unit 111 and the wiping unit 131 are positioned not to overlap each other.

According to the above configuration, the cap unit 111 and the wiping unit 131 can be individually accessed from the exposure opening 25. Therefore, workability is good when the cap unit 111 and the wiping unit 131 are replaced or repaired.

7. The exposure opening 25 exposes the mounting unit 101. When the exposure opening 25 is viewed from the position facing the opening surface 22, the mounting unit 101 is positioned not to overlap the supply unit 41, the maintenance unit 71, and the selector unit 141.

According to the above configuration, when the mounting unit 101 is taken out of the exposure opening 25, the mounting unit 101 does not interfere with the supply unit 41, the maintenance unit 71, and the selector unit 141. That is, the supply unit 41, the maintenance unit 71, the selector unit 141, and the mounting unit 101 can be individually taken out of the exposure opening 25. Therefore, it is easy to replace the unit.

8. Fixing members such as the supply fixing member 70, the maintenance fixing member 97, and the selector fixing member 146 are exposed from the exposure opening 25. In this example, the mounting fixing member 107 is further exposed from the exposure opening 25.

According to the above configuration, the fixing member can be easily removed through the exposure opening 25. As a result, workability is good when the supply unit 41, the maintenance unit 71, and the selector unit 141 are replaced through the exposure opening 25. In this example, workability is good even when the mounting unit 101 is replaced.

9. The supply unit 41 has the supply tray 65. The supply tray 65 is fixed to the housing 12 by the supply fixing member 70. The supply tray 65 is exposed from the exposure opening 25. The supply fixing member 70 is exposed from the exposure opening 25. According to the above configuration, the supply fixing member 70 can be easily removed through the exposure opening 25. As a result, workability is good when the supply unit 41 is replaced through the exposure opening 25.

10. The maintenance unit 71 has the maintenance tray 92. The maintenance tray 92 is fixed to the housing 12 by the maintenance fixing member 97. The maintenance tray 92 is exposed from the exposure opening 25. The maintenance fixing member 97 is exposed from the exposure opening 25.

According to the above configuration, the maintenance fixing member 97 can be easily removed through the exposure opening 25. As a result, workability is good when the maintenance unit 71 is replaced through the exposure opening 25.

11. The supply detecting portion 66 is positioned on the supply tray 65. The maintenance detecting portion 93 is positioned on the maintenance tray 92.

According to the above configuration, the supply detecting portion 66 detects the liquid in the supply tray 65. The maintenance detecting portion 93 detects the waste liquid in the maintenance tray 92. The maintenance detecting portion 93 detects the moisturizer in the maintenance tray 92. Thereby, the liquid leakage in the liquid ejecting apparatus 11 can be detected.

The present embodiment can be modified and implemented as follows. The present embodiment and the following modification examples can be implemented in combination with each other within a technically consistent range.

The liquid ejecting apparatus 11 may include a flow path for coupling the supply unit 41 and the maintenance unit 71 as a coupling flow path. For example, the liquid ejecting apparatus 11 may include a coupling flow path for directly sending the liquid as waste liquid from the supply unit 41 to the maintenance unit 71. In this case, at least one end of the coupling flow path for coupling the supply unit 41 and the maintenance unit 71 may be exposed from the exposure opening 25.

The liquid discharged by the head 32 is not limited to ink, and may be, for example, a liquid material in which particles of a functional material are dispersed or mixed in the liquid. For example, the head 32 may discharge a liquid material containing a material such as an electrode material or a pixel material used for manufacturing a liquid crystal display, an electroluminescence display, a surface emitting display, or the like in a dispersed or dissolved form.

Hereinafter, the technical idea grasped from the embodiment and the modification examples described above and the action effects thereof will be described.

A. A liquid ejecting apparatus including: a head having a nozzle that ejects a liquid; a supply unit that supplies a liquid to the head; a maintenance unit for maintaining the head; a selector unit that selects a unit to be opened to an atmosphere from the supply unit and the maintenance unit; and a housing that accommodates the supply unit, the maintenance unit, and the selector unit, in which the housing has an opening surface to which an exposure opening is open and a cover that closes the exposure opening, the exposure opening exposes the supply unit, the maintenance unit, and the selector unit, and when the exposure opening is viewed from a position facing the opening surface, the supply unit, the maintenance unit, and the selector unit are positioned not to overlap each other.

According to the above configuration, when one unit among the supply unit, the maintenance unit, and the selector unit is taken out of the exposure opening, the unit does not interfere with the other unit. Therefore, when one unit is taken out of the exposure opening, it is not necessary to take out another unit. That is, the supply unit, the maintenance unit, and the selector unit can be individually taken out of the exposure opening. Therefore, it is easy to replace the unit.

B. The liquid ejecting apparatus may further include a coupling flow path for coupling two units among the supply unit, the maintenance unit, and the selector unit, the coupling flow path may include an elastic flow path part, and one end of the coupling flow path may be exposed from the exposure opening.

According to the above configuration, it is easy to access one end of the coupling flow path through the exposure opening. Therefore, the coupling flow path can be easily removed from one unit. Since the flow path part has elasticity, the flow path part can be deformed. Thereby, when one unit is taken out of the exposure opening, the flow path part can be deformed such that the coupling flow path does not interfere with the supply unit, the maintenance unit, and the selector unit. Therefore, it is easy to replace the unit.

C. The liquid ejecting apparatus may further include a coupling flow path for coupling two units among the supply unit, the maintenance unit, and the selector unit, and both ends of the coupling flow path may be exposed from the exposure opening.

According to the above configuration, it is easy to access both ends of the coupling flow path through the exposure opening. Therefore, the coupling flow path can be easily removed from both units. By removing both ends of the coupling flow path from the unit, the coupling flow path can be taken out of the exposure opening. As a result, when one unit is taken out of the exposure opening, there is no concern that the coupling flow path interferes with the supply unit, the maintenance unit, and the selector unit. Therefore, it is easy to replace the unit.

D. The liquid ejecting apparatus may further include a cap unit that comes into contact with the head to cover the nozzle, and when the exposure opening is viewed from the position facing the opening surface, the cap unit may be positioned to overlap at least one of the supply unit, the maintenance unit, and the selector unit.

According to the above configuration, the size expansion of the liquid ejecting apparatus can be suppressed as compared with the case where the cap unit does not overlap at least one of the supply unit, the maintenance unit, and the selector unit. Further, when the cap unit is taken out of the exposure opening, the cap unit can be accessed from the exposure opening by removing the unit that overlaps the cap unit. That is, the cap unit can be accessed in addition to the supply unit, the maintenance unit, and the selector unit through the exposure opening. In this manner, the opening that can access the supply unit, the maintenance unit, and the selector unit, and the opening that can access the cap unit are integrated as the exposure opening. Therefore, workability is improved when the unit is replaced or repaired.

E. The liquid ejecting apparatus may further include a wiping unit that wipes a nozzle surface in which the nozzle is open in the head, and when the exposure opening is viewed from the position facing the opening surface, the wiping unit may be positioned to overlap at least one of the supply unit, the maintenance unit, and the selector unit.

According to the above configuration, the size expansion of the liquid ejecting apparatus can be suppressed as compared with the case where the wiping unit does not overlap at least one of the supply unit, the maintenance unit, and the selector unit. Further, when the wiping unit is taken out of the exposure opening, the wiping unit can be accessed from the exposure opening by removing the unit that overlaps the wiping unit. That is, in addition to the supply unit, the maintenance unit, and the selector unit, the wiping unit can also be accessed through the exposure opening. In this manner, the opening that can access the supply unit, the maintenance unit, and the selector unit, and the opening that can access the wiping unit are integrated as the exposure opening. Therefore, workability is good when the unit is replaced or repaired.

F. In the liquid ejecting apparatus, when the exposure opening is viewed from the position facing the opening surface, the cap unit and the wiping unit may be positioned not to overlap each other.

According to the above configuration, the cap unit and the wiping unit can be individually accessed from the exposure opening. Therefore, workability is good when the cap unit and the wiping unit are replaced or repaired.

G. The liquid ejecting apparatus may further include a mounting unit configured such that a mounting body for accommodating a liquid ejected as a waste liquid from the head is mounted, and the exposure opening may expose the mounting unit, and when the exposure opening is viewed from the position facing the opening surface, the mounting unit may be positioned not to overlap the supply unit, the maintenance unit, and the selector unit.

According to the above configuration, when the mounting unit is taken out of the exposure opening, the mounting unit does not interfere with the supply unit, the maintenance unit, and the selector unit. That is, the supply unit, the maintenance unit, the selector unit, and the mounting unit can be individually taken out of the exposure opening. Therefore, it is easy to replace the unit.

H. The liquid ejecting apparatus may further include a plurality of fixing members that fix the supply unit, the maintenance unit, and the selector unit to the housing, respectively, and the plurality of fixing members may be exposed from the exposure opening.

According to the above configuration, the fixing member can be easily removed through the exposure opening. As a result, workability is good when the supply unit, the maintenance unit, and the selector unit are replaced through the exposure opening.

I. The liquid ejecting apparatus may further include a fixing member that fixes the supply unit to the housing, the supply unit may have a tray, the tray may be fixed to the housing by the fixing member and exposed from the exposure opening, and the fixing member may be exposed from the exposure opening. According to the above configuration, the fixing member can be easily removed through the exposure opening. As a result, workability is good when the supply unit is replaced through the exposure opening.

J. The liquid ejecting apparatus may further include a fixing member that fixes the maintenance unit to the housing, the maintenance unit may have a tray, the tray may be fixed to the housing by the fixing member and exposed from the exposure opening, and the fixing member may be exposed from the exposure opening. According to the above configuration, the fixing member can be easily removed through the exposure opening. As a result, workability is good when the maintenance unit is replaced through the exposure opening.

K. The liquid ejecting apparatus may further include a detecting portion that detects a liquid, and the detecting portion may be positioned on the tray. According to the above configuration, the detecting portion detects the liquid in the tray. Thereby, the liquid leakage in the liquid ejecting apparatus can be detected.

What is claimed is:

1. A liquid ejecting apparatus comprising:

a head having a nozzle that ejects a liquid;

a supply unit that supplies a liquid to the head;

a maintenance unit for maintaining the head;

a selector unit that selects a unit to be opened to an atmosphere from the supply unit and the maintenance unit; and a housing that accommodates the supply unit, the maintenance unit, and the selector unit, wherein the housing has an opening surface to which an exposure opening is open and a cover that closes the exposure opening, the exposure opening exposes the supply unit, the maintenance unit, and the selector unit, and when the exposure opening is viewed from a position facing the opening surface, the supply unit, the maintenance unit, and the selector unit are positioned not to overlap each other.

2. The liquid ejecting apparatus according to claim 1, further comprising:

a coupling flow path for coupling two units among the supply unit, the maintenance unit, and the selector unit, wherein the coupling flow path includes a flow path part having elasticity, and one end of the coupling flow path is exposed from the exposure opening.

3. The liquid ejecting apparatus according to claim 1, further comprising:

a coupling flow path for coupling two units among the supply unit, the maintenance unit, and the selector unit, and both ends of the coupling flow path are exposed from the exposure opening.

4. The liquid ejecting apparatus according to claim 1, further comprising:

a cap unit that comes into contact with the head to cover the nozzle, wherein when the exposure opening is viewed from the position facing the opening surface, the cap unit is positioned to overlap at least one of the supply unit, the maintenance unit, and the selector unit.

5. The liquid ejecting apparatus according to claim 4, further comprising:

a wiping unit that wipes a nozzle surface in which the nozzle is open in the head, wherein when the exposure opening is viewed from the position facing the opening surface, the wiping unit is positioned to overlap at least one of the supply unit, the maintenance unit, and the selector unit.

6. The liquid ejecting apparatus according to claim 5, wherein when the exposure opening is viewed from the position facing the opening surface, the cap unit and the wiping unit are positioned not to overlap each other.

7. The liquid ejecting apparatus according to claim 1, further comprising:

a mounting unit configured such that a mounting body for accommodating a liquid discharged as a waste liquid from the head is mounted, wherein the exposure opening exposes the mounting unit, and when the exposure opening is viewed from the position facing the opening surface, the mounting unit is positioned not to overlap the supply unit, the maintenance unit, and the selector unit.

8. The liquid ejecting apparatus according to claim 1, further comprising:

a plurality of fixing members that fix the supply unit, the maintenance unit, and the selector unit to the housing, respectively, wherein the plurality of fixing members are exposed from the exposure opening.

9. The liquid ejecting apparatus according to claim 1, further comprising:

a fixing member that fixes the supply unit to the housing, wherein the supply unit has a tray, the tray is fixed to the housing by the fixing member and exposed from the exposure opening, and the fixing member is exposed from the exposure opening.

10. The liquid ejecting apparatus according to claim 1, further comprising:

a fixing member that fixes the maintenance unit to the housing, wherein the maintenance unit has a tray, the tray is fixed to the housing by the fixing member and exposed from the exposure opening, and the fixing member is exposed from the exposure opening.

11. The liquid ejecting apparatus according to claim 9, further comprising:

a detecting portion that detects a liquid, wherein the detecting portion is positioned on the tray.

12. The liquid ejecting apparatus according to claim 10, further comprising:

a detecting portion that detects a liquid, wherein the detecting portion is positioned on the tray.

* * * * *